United States Patent
Hawkins et al.

(10) Patent No.: US 12,387,221 B2
(45) Date of Patent: Aug. 12, 2025

(54) METHODS, APPARATUS AND SYSTEMS FOR REUSABLE ASSETS

(71) Applicant: Circular Solutions Inc., Vancouver (CA)

(72) Inventors: Jason Hawkins, North Vancouver (CA); Anastasia Kiku, Vancouver (CA); Jack Gralla, Seattle, WA (US)

(73) Assignee: CIRCULAR SOLUTIONS INC., Vancouver (CA)

( * ) Notice: Subject to any disclaimer, the term of this patent is extended or adjusted under 35 U.S.C. 154(b) by 0 days.

(21) Appl. No.: 18/637,684

(22) Filed: Apr. 17, 2024

(65) Prior Publication Data
US 2024/0289806 A1    Aug. 29, 2024

Related U.S. Application Data

(63) Continuation of application No. PCT/CA2024/050221, filed on Feb. 23, 2024.
(Continued)

(51) Int. Cl.
G06Q 20/40      (2012.01)
G06Q 10/30      (2023.01)
G06Q 20/20      (2012.01)

(52) U.S. Cl.
CPC .......... *G06Q 20/405* (2013.01); *G06Q 10/30* (2013.01); *G06Q 20/20* (2013.01)

(58) Field of Classification Search
CPC ....... G06Q 20/405; G06Q 10/30; G06Q 20/20
See application file for complete search history.

(56) References Cited

U.S. PATENT DOCUMENTS

| 4,579,216 A | * | 4/1986 | DeWoolfson | ............. | G07F 9/08 |
| | | | | | 100/902 |
| 8,374,967 B2 | * | 2/2013 | Chirnomas | ............. | G07F 9/002 |
| | | | | | 705/40 |

(Continued)

FOREIGN PATENT DOCUMENTS

| CN | 107679957 A | * | 2/2018 | ......... G06Q 30/0645 |
| CN | 107833156 A | * | 3/2018 | |

(Continued)

OTHER PUBLICATIONS

Wildwistle, J. (2022). Exploring reusable takeout packaging as an alternative to disposable plastics in maine's restaurant industry (Order No. 30393853) . . . (2800160853). Retrieved from https://www.proquest.com/dissertations-theses/exploring-reusable-takeout-packaging-as/docview/2800160853/se-2 (Year: 2022).*

*Primary Examiner* — Ashford S Hayles
(74) *Attorney, Agent, or Firm* — Roni M. Jones; Oyen Wiggs Green & Mutala LLP

(57) ABSTRACT

An asset management system configured for receiving an indication of acceptance of an agreement for borrowing of an asset by a consumer, receiving a consumer identifier corresponding to the consumer from a payment processing system connected to the asset management system, receiving an asset identifier indicative of the asset, obtaining a term for a return of the asset, obtaining a penalty payable upon the return of the asset not occurring within the term, storing the consumer identifier, asset identifier, term and penalty in a data storage of the asset management system and upon the return of the asset not occurring within the term, sending a request to the payment processing system to charge the first consumer in an amount of the penalty using (Continued)

payment information of the consumer stored in the data storage of the payment processing system in association with the consumer identifier.

18 Claims, 7 Drawing Sheets

Related U.S. Application Data

(60) Provisional application No. 63/448,206, filed on Feb. 24, 2023.

(56) References Cited

U.S. PATENT DOCUMENTS

| | | | |
|---|---|---|---|
| 8,942,998 B2 | 1/2015 | Thomas | |
| 10,089,682 B1 * | 10/2018 | Bernstein | G06Q 30/0645 |
| 2002/0082917 A1 * | 6/2002 | Takano | H04N 21/4184 |
| | | | 348/E7.071 |
| 2002/0161670 A1 * | 10/2002 | Walker | G06Q 30/0603 |
| | | | 705/26.1 |
| 2002/0161878 A1 * | 10/2002 | Okamura | G06K 19/07758 |
| | | | 709/223 |
| 2003/0033601 A1 * | 2/2003 | Sakata | H04N 21/4826 |
| | | | 348/E7.071 |
| 2004/0016620 A1 * | 1/2004 | Davis | G07F 7/069 |
| | | | 194/205 |
| 2004/0162063 A1 * | 8/2004 | Quinones | G06Q 10/109 |
| | | | 455/419 |
| 2005/0055308 A1 | 3/2005 | Meyer et al. | |
| 2005/0192834 A1 * | 9/2005 | Yates | G06Q 30/0645 |
| | | | 705/307 |
| 2005/0289032 A1 * | 12/2005 | Hoblit | G06Q 40/00 |
| | | | 707/999.1 |
| 2006/0195221 A1 | 8/2006 | Tanaka | |
| 2007/0118526 A1 * | 5/2007 | Gifford | G06Q 30/06 |
| | | | 707/999.009 |
| 2007/0143207 A1 * | 6/2007 | Breen | G06Q 20/102 |
| | | | 705/40 |
| 2007/0156442 A1 * | 7/2007 | Ali | G06Q 10/02 |
| | | | 705/307 |
| 2008/0115465 A1 * | 5/2008 | Dickinson | B65D 81/1275 |
| | | | 206/769 |
| 2008/0306813 A1 * | 12/2008 | Romansky | G06Q 30/02 |
| | | | 705/14.1 |
| 2014/0012643 A1 * | 1/2014 | Behrisch | G06Q 10/30 |
| | | | 705/14.11 |
| 2014/0372241 A1 * | 12/2014 | Maier | G06Q 50/12 |
| | | | 705/26.1 |
| 2015/0088620 A1 * | 3/2015 | Wittek | G06Q 30/0207 |
| | | | 705/14.1 |
| 2015/0332217 A1 * | 11/2015 | Sharab | G06Q 10/08 |
| | | | 705/340 |
| 2016/0005108 A1 * | 1/2016 | Willis | G06Q 30/0645 |
| | | | 705/44 |
| 2016/0099590 A1 * | 4/2016 | Velderman | G07F 7/06 |
| | | | 320/113 |
| 2016/0148200 A1 * | 5/2016 | Pureetip | G06Q 20/381 |
| | | | 705/39 |
| 2016/0267562 A1 * | 9/2016 | Follis | G06Q 10/083 |
| 2019/0251522 A1 * | 8/2019 | Wallis | G06Q 30/0633 |
| 2019/0333304 A1 * | 10/2019 | Flynn | G06Q 20/327 |
| 2020/0320657 A1 * | 10/2020 | Lu | G06Q 30/0185 |
| 2021/0081909 A1 * | 3/2021 | Wittek | G06K 7/10297 |
| 2021/0241238 A1 * | 8/2021 | Sperry | G06Q 10/30 |
| 2021/0304548 A1 * | 9/2021 | Li | G07F 9/006 |
| 2021/0326818 A1 * | 10/2021 | Hogg | G06F 16/958 |
| 2021/0383462 A1 * | 12/2021 | Nagasawa | G06Q 30/0222 |
| 2022/0139146 A1 * | 5/2022 | Wallis | G07F 7/069 |
| | | | 194/205 |
| 2022/0261750 A1 * | 8/2022 | Nguyen | G06Q 10/0833 |
| 2022/0405871 A1 * | 12/2022 | Nitta | G06Q 30/0645 |
| 2023/0222532 A1 * | 7/2023 | Greenberger | G06Q 30/0233 |
| | | | 705/14.33 |
| 2023/0289715 A1 * | 9/2023 | Schnitzer | G06Q 10/30 |

FOREIGN PATENT DOCUMENTS

| | | | | | |
|---|---|---|---|---|---|
| CN | 109360073 A | * | 2/2019 | | |
| JP | 2004220350 A | * | 8/2004 | | |
| JP | 2005135155 A | * | 5/2005 | | |
| JP | 2010173702 A | * | 8/2010 | | |
| JP | 2021072038 A | * | 5/2021 | | |
| KR | 101782430 B1 | * | 10/2017 | | |
| KR | 20220138042 A | * | 10/2022 | | |
| KR | 20220167732 A | * | 12/2022 | | |
| KR | 20230126137 A | * | 8/2023 | | |
| WO | WO-0239328 A2 | * | 5/2002 | | G06Q 30/06 |
| WO | WO-2019071983 A1 | * | 4/2019 | | G06Q 30/0645 |
| WO | WO-2020151203 A1 | * | 7/2020 | | |
| WO | WO-2022094665 A1 | * | 5/2022 | | |

* cited by examiner

METHODS, APPARATUS AND SYSTEMS FOR REUSABLE ASSETS

REFERENCE TO RELATED APPLICATIONS

This application is a continuation application of Patent Cooperation Treaty (PCT) application No. PCT/CA2024/050221 having an international filing date of 23 Feb. 2024, which in turn claims priority from, and for the purposes of the United States the benefit under 35 USC 119 in relation to, U.S. patent application No. 63/448,206 filed on 24 Feb. 2023, both of which are hereby incorporated herein by reference.

TECHNICAL FIELD

This application relates to methods, apparatus and systems for renting, distributing, allocating, tracking, collecting and/or managing reusable assets. In some embodiments, the reusable assets comprise reusable containers and/or packaging for food, hygiene products and/or household products.

BACKGROUND

It is currently understood that containers and packaging make up a significant portion of solid waste entering landfills. There is a general desire to employ reusable containers and packaging to, inter alia, reduce the amount of containers and packaging entering landfill waste streams. While in some situations it may be practical for a consumer to provide their own reusable containers and packaging, this is not always the case. Some consumers are not willing to provide their own reusable containers and packaging. Some health authorities place onerous restrictions on the use of "bring your own" reusable packaging. There is therefore a general desire for reusable containers and packaging that is provided by a retailer at the time of purchasing the packaged products. However, previous methods, systems and apparatus undesirably require consumers to pay deposits and/or provide personal information (beyond what is otherwise required to make the underlying purchase) to create accounts at the time of purchasing packaged products thereby creating a barrier to use of such reusable containers and packaging.

There is therefore a general desire for improved methods, systems and apparatus to facilitate renting, distributing, allocating, tracking, collecting and/or managing reusable assets such as reusable containers and/or packaging for food, hygiene products and/or household products.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provide an asset management system. The asset management system may comprise a processor configured for receiving an indication of acceptance of an agreement for borrowing of an asset by a first consumer as part of a transaction for a first product, receiving a consumer identifier corresponding to the first consumer from a payment processing system employed to complete the transaction for the first product, receiving an asset identifier indicative of the asset, obtaining a term for a return of the asset, obtaining a magnitude of a penalty payable upon the return of the asset not occurring within the term, storing the consumer identifier, asset identifier, term and penalty in a data storage of the asset management system and upon the return of the asset not occurring within the term, sending a request to the payment processing system to charge the first consumer an amount equal to the magnitude of the penalty via the payment processing system using payment information of the first consumer stored in a data storage of the payment processing system in association with the consumer identifier.

In some embodiments, the indication of the acceptance is received from a point of sale system. In some embodiments, the indication of the acceptance is received by the asset management system from the point of sale system. In some embodiments, the indication of the acceptance is received by the asset management system from the payment processing system. In some embodiments, receiving the indication of acceptance comprises receiving the consumer identifier.

In some embodiments, the point of sale system is connected to the asset management system by a network. In some embodiments, the point of sale system is connected to the payment processing system by a network.

In some embodiments, the asset identifier is unique to the asset. In some embodiments, the asset identifier is unique to a class of the asset.

In some embodiments, obtaining the term comprises receiving an indication of the term from the payment processing system. In some embodiments, obtaining the term comprises receiving an indication of the term from a point of sale system connected to the asset management system by a network. In some embodiments, obtaining the term comprises determining the term based at least in part on the asset identifier. In some embodiments, obtaining the term comprises determining the term based at least in part on a type of asset associated with the asset identifier. In some embodiments, obtaining the term comprises determining the term based at least in part on the consumer identifier. In some embodiments, obtaining the term comprises determining the term based at least in part on an asset borrowing history associated with the consumer identifier.

In some embodiments, obtaining the penalty comprises receiving an indication of the penalty from the payment processing system. In some embodiments, obtaining the penalty comprises receiving an indication of the penalty from a point of sale system connected to the asset management system by a network. In some embodiments, obtaining the penalty comprises determining the penalty based at least in part on the asset identifier. In some embodiments, obtaining the penalty comprises determining the penalty based at least in part on a type of asset associated with the asset identifier. In some embodiments, obtaining the penalty comprises determining the penalty based at least in part on the consumer identifier. In some embodiments, obtaining the penalty comprises determining the penalty based at least in part on an asset borrowing history associated with the consumer identifier. In some embodiments, the processor is configured for upon the return of the asset occurring after sending a request to the payment processing system to charge the first consumer in the amount of the penalty using payment information of the first consumer, sending a request to the payment processing system to refund the first consumer at least a portion of the amount of the penalty using the payment information of the consumer associated with the consumer identifier.

In some embodiments, the asset management system and the payment processing system are operated by separate entities.

In some embodiments, the asset comprises a reusable container.

In some embodiments, the data storage of the asset management system is separate from the data storage of the payment processing system.

In some embodiments, the asset management system is in communication with the payment processing system via a network.

In some embodiments, the payment information is obtained from the transaction for the first product. In some embodiments, the payment information is obtained from a transaction for a second product.

In some embodiments, the processor is configured for sending the request to the payment processing system to charge the first consumer the amount equal to the magnitude of the penalty via the payment processing system using payment information of the first consumer stored in the data storage of the payment processing system in association with the consumer identifier only upon the return of the asset not occurring within the term.

In some embodiments, the system comprises at least one server and/or processor having at least one application program and computer instructions operating thereon which are configured to cause at least one server and/or processor to perform the methods, steps and/or functions set out herein.

Another aspect of the invention provides an asset management method. The method may comprise receiving an indication of acceptance of an agreement for borrowing of an asset by a first consumer as part of a transaction for a first product, receiving a consumer identifier corresponding to the first consumer from a payment processing system employed to complete the transaction for the first product, receiving an asset identifier indicative of the asset, obtaining a term for a return of the asset, obtaining a magnitude of a penalty payable upon the return of the asset not occurring within the term, storing the consumer identifier, asset identifier, term and penalty in a data storage of the asset management system and upon the return of the asset not occurring within the term, sending a request to the payment processing system to charge the first consumer an amount equal to the magnitude of the penalty via the payment processing system using payment information of the first consumer stored in a data storage of the payment processing system in association with the consumer identifier.

In some embodiments, the indication of the acceptance is received from a point of sale system.

In some embodiments, the point of sale system is connected to the asset management system by a network. In some embodiments, the point of sale system is connected to the payment processing system by a network.

In some embodiments, the indication of the acceptance is received by the asset management system from the point of sale system. In some embodiments, the indication of the acceptance is received by the asset management system from the payment processing system. In some embodiments, receiving the indication of acceptance comprises receiving the consumer identifier.

In some embodiments, the asset identifier is unique to the asset. In some embodiments, the asset identifier is unique to a class of the asset.

In some embodiments, obtaining the term comprises receiving an indication of the term from the payment processing system. In some embodiments, obtaining the term comprises receiving an indication of the term from a point of sale system connected to the asset management system by a network. In some embodiments, obtaining the term comprises determining the term based at least in part on the asset identifier. In some embodiments, obtaining the term comprises determining the term based at least in part on a type of asset associated with the asset identifier. In some embodiments, obtaining the term comprises determining the term based at least in part on the consumer identifier. In some embodiments, obtaining the term comprises determining the term based at least in part on an asset borrowing history associated with the consumer identifier.

In some embodiments, obtaining the penalty comprises receiving an indication of the penalty from the payment processing system. In some embodiments, obtaining the penalty comprises receiving an indication of the penalty from a point of sale system connected to the asset management system by a network. In some embodiments, obtaining the penalty comprises determining the penalty based at least in part on the asset identifier. In some embodiments, obtaining the penalty comprises determining the penalty based at least in part on a type of asset associated with the asset identifier. In some embodiments, obtaining the penalty comprises determining the penalty based at least in part on the consumer identifier. In some embodiments, obtaining the penalty comprises determining the penalty based at least in part on an asset borrowing history associated with the consumer identifier.

In some embodiments, the method comprises upon the return of the asset occurring after sending a request to the payment processing system to charge the first consumer in the amount of the penalty using payment information of the first consumer, sending a request to the payment processing system to refund the first consumer at least a portion of the amount of the penalty using the payment information of the consumer associated with the consumer identifier.

In some embodiments, the asset management system and the payment processing system are operated by separate entities. In some embodiments, the asset management system and the payment processing system are located remotely from each other.

In some embodiments, the asset comprises a reusable container.

In some embodiments, the data storage of the asset management system is separate from the data storage of the payment processing system.

In some embodiments, the asset management system is in communication with the payment processing system via a network.

In some embodiments, the payment information is obtained from the transaction for the first product.

In some embodiments,, the method comprises prompting the first consumer to accept the agreement for borrowing of the asset and upon receiving acceptance of the agreement for borrowing of the asset, providing the asset to the first consumer.

In some embodiments, the method comprises prompting the first consumer to accept the agreement for borrowing of the asset upon receiving from the first consumer an indicated that they desire to borrow the asset and upon receiving acceptance of the agreement for borrowing of the asset, providing the asset to the first consumer.

In some embodiments, the method comprises upon receiving acceptance of the agreement for borrowing of the asset, providing the asset to the first consumer without requesting the payment processing system to charge the first consumer a deposit for the asset. In some embodiments, the method comprises upon receiving acceptance of the agreement for borrowing of the asset, providing the asset to the first consumer without requesting the payment processing system to authorize a deposit for the asset with the payment information. In some embodiments, the method comprises providing the asset to the first consumer upon receipt, by the asset management system, of the indication of acceptance of the agreement for borrowing of the asset by the first consumer.

In some embodiments, the method comprises sending a request to the payment processing system to charge the first consumer for the first product using the payment information.

In some embodiments, the method comprises prompting the first consumer to accept the agreement by displaying a prompt containing at least a portion of the agreement on a graphical user interface of the point of sale system.

In some embodiments, receiving acceptance of the first agreement comprises receiving the payment information from the first consumer. In some embodiments, receiving acceptance of the first agreement comprises receiving a consumer identifier of the consumer and confirming that the acceptance has previously been provided in association with the consumer identifier. In some embodiments, receiving a consumer identifier of the consumer comprises receiving a previously borrowed asset and obtaining the consumer identifier of the consumer based on an asset identifier of the previously borrowed asset.

In some embodiments, receiving acceptance of the first agreement comprises the first consumer selecting an element displayed on a graphical user interface of the point of sale system. In some embodiments, receiving the payment information from the first consumer comprises the first consumer inputting the payment information via a graphical user interface of the point of sale system. In some embodiments, receiving the payment information from the first consumer comprises the user placing an RFID enabled credit card or debit card near an RFID scanner of the point of sale system thereby allowing the point of sale system to obtain the payment information. In some embodiments, receiving the payment information from the first consumer comprises receiving a consumer identifier of the consumer and obtaining the payment information from a record stored in association with the consumer identifier. In some embodiments, receiving a consumer identifier of the consumer comprises receiving a previously borrowed asset and obtaining the consumer identifier of the consumer based on an asset identifier of the previously borrowed asset.

In some embodiments, receiving input of an asset identifier corresponding to the asset comprises placing an RFID enabled tag representative of the asset identifier and attached to the asset near an RFID scanner of the point of sale system thereby allowing the point of sale system to obtain the asset identifier. In some embodiments, receiving input of an asset identifier corresponding to the asset comprises scanning a barcode or QR code representative of the asset identifier and attached to the asset near a scanner of the point of sale system thereby allowing the point of sale system to obtain the asset identifier. In some embodiments, receiving input of an asset identifier corresponding to the asset comprises monitoring for the removal of the asset from among stocked assets by tracking the presence of RFID enabled tags representative of asset identifiers of the stocked assets, wherein each RFID enable tag is attached to one of the stocked assets.

Another aspect of the invention comprises a system. The system may comprise a point of sale system, a payment processing system and an asset management system. The point of sale system may be configured for, prompting a first consumer to accept an agreement for the borrowing of an asset by the first consumer and receiving acceptance of the agreement, receiving acceptance of the agreement from the first consumer, prompting the first consumer to pay for a product by providing payment information, receiving the payment information from the first consumer, and receiving input of an asset identifier corresponding to the asset. The payment processing system may be configured for receiving payment information from the point of sale system, processing payment for the product with the payment information, and storing the payment information in association with a consumer identifier for future use. The asset management system may be configured for receiving an indication of acceptance of the agreement from the point of sale system, receiving the consumer identifier corresponding to the first consumer from the payment processing system, receiving the asset identifier indicative of the asset from the point of sale system, obtaining a term for a return of the asset, obtaining a penalty payable upon the return of the asset not occurring within the term, storing the consumer identifier, asset identifier, term and penalty in a data storage of the asset management system and upon the return of the asset not occurring within the term, sending a request to the payment processing system to charge the first consumer in the amount of the penalty using the payment information of the first consumer stored in data storage of the payment processing system in association with the consumer identifier.

In some embodiments, prompting the first consumer to accept the agreement comprises displaying a prompt containing at least a portion of the agreement on a graphical user interface of the point of sale system.

In some embodiments, receiving acceptance of the first agreement comprises receiving the payment information from the first consumer. In some embodiments, receiving acceptance of the first agreement comprises receiving a consumer identifier of the consumer and confirming that the acceptance has previously been provided in association with the consumer identifier. In some embodiments, receiving acceptance of the first agreement comprises the first consumer selecting an element displayed on a graphical user interface of the point of sale system.

In some embodiments, receiving a consumer identifier of the consumer comprises receiving a previously borrowed asset and obtaining the consumer identifier of the consumer based on an asset identifier of the previously borrowed asset. In some embodiments, receiving a consumer identifier of the consumer comprises receiving a previously borrowed asset and obtaining the consumer identifier of the consumer based on an asset identifier of the previously borrowed asset.

In some embodiments, receiving the payment information from the first consumer comprises the first consumer inputting the payment information via a graphical user interface of the point of sale system. In some embodiments, receiving the payment information from the first consumer comprises the user placing an RFID enabled credit card or debit card near an RFID scanner of the point of sale system thereby allowing the point of sale system to obtain the payment information. In some embodiments, receiving the payment information from the first consumer comprises receiving a consumer identifier of the consumer and obtaining the payment information from a record stored in association with the consumer identifier.

In some embodiments, receiving input of an asset identifier corresponding to the asset comprises placing an RFID enabled tag representative of the asset identifier and attached to the asset near an RFID scanner of the point of sale system thereby allowing the point of sale system to obtain the asset identifier. In some embodiments, receiving input of an asset identifier corresponding to the asset comprises scanning a barcode or QR code representative of the asset identifier and attached to the asset near a scanner of the point of sale system thereby allowing the point of sale system to obtain the asset identifier.

In some embodiments, the system comprises an asset return infrastructure, the asset return infrastructure comprising a receptacle for receiving the asset and a scanner for obtaining the asset identifier when the asset is placed in, on or near the receptacle and wherein the asset return infrastructure is configured to communicate to the asset management system that the asset has been returned upon obtaining the asset identifier.

In some embodiments, the system comprises at least one server and/or processor having at least one application program and computer instructions operating thereon which are configured to cause at least one server and/or processor to perform the methods, steps and/or functions set out herein.

Another aspect of the invention provides a system comprising at least one server and/or processor having at least one application program and computer instructions operating thereon which are configured to cause at least one server and/or processor to perform the methods, steps and/or functions set out herein.

Another aspect of the invention provides a non-transitory, computer readable medium having at least one application program or computer instructions operating thereon which are configured to cause at least one server and/or processor to perform the methods, steps and/or functions set out herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
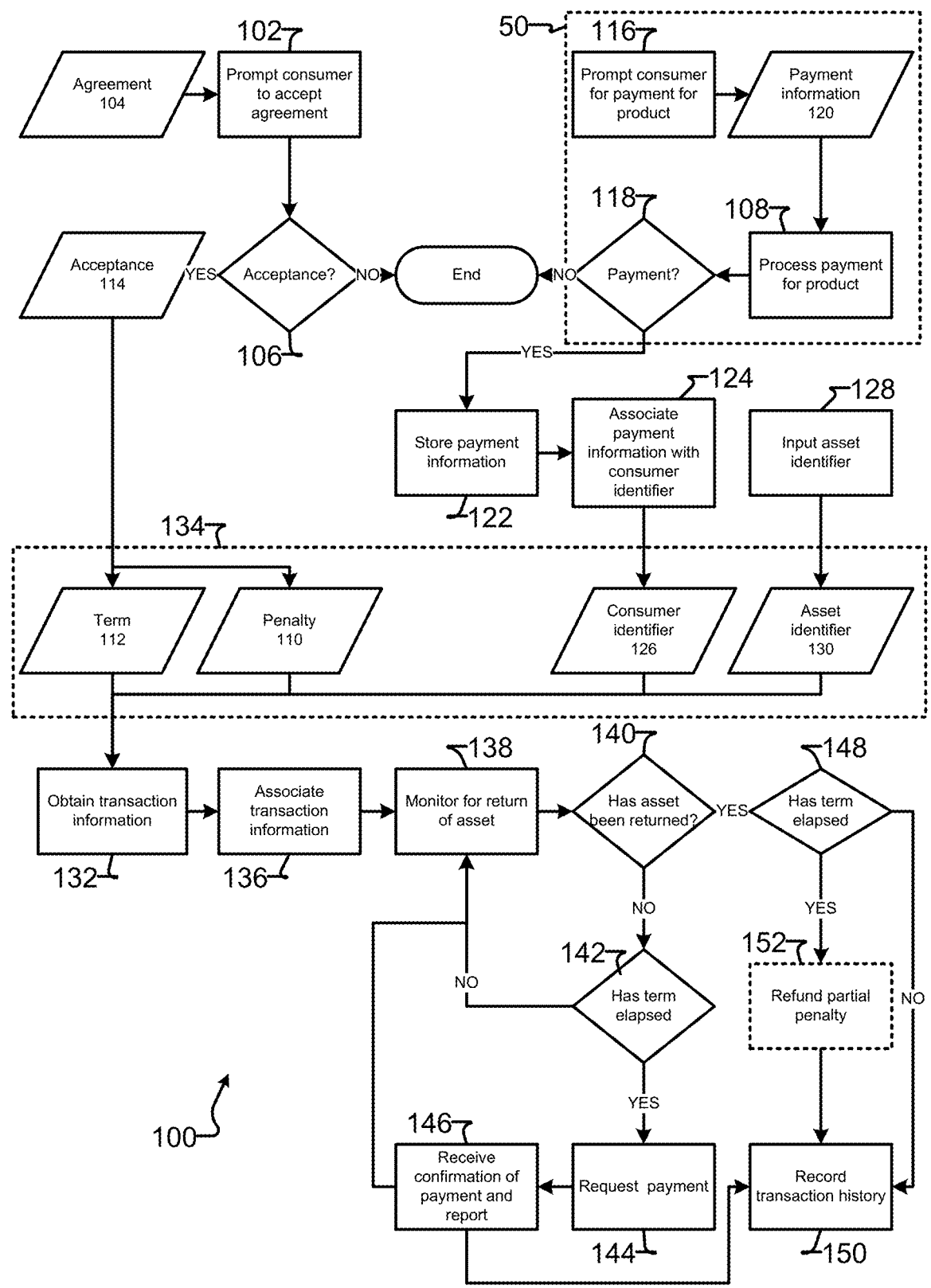
FIG. 1 is a block diagram of an exemplary method of managing distribution of an asset in association with a transaction for purchase of a product according to one embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments herein may relate to one or more reusable assets 2 (referred to herein as assets 2 or an asset 2). An asset 2 may comprise, for example, a reusable container or packaging for holding one or more products 4. Products 4 may comprise, for example, food products (e.g., coffee, tea, yogurt, sandwiches, soup, meals, etc.), hygiene products (e.g., soap, moisturizer, shampoo, conditioner, toothpaste, etc.), household products (e.g., household cleaners, laundry detergent, etc.), commercial products (e.g., adhesives, fertilizers, cleaning agents, etc.) or other products. For example, an asset 2 may comprise a reusable coffee cup or the like.

Products 4 may be sold by merchants 60 through transactions 50. As part of transactions 50, consumers 6 may wish to obtain assets 2 to complement products 4 (e.g., as containers for products 4). For example, a consumer 6 may want to obtain a reusable cup (asset 2) at a coffee shop (merchant 60) to hold a coffee (product 4) being purchased at that time. However, consumer 6 may not wish to pay a deposit for asset 2 and requiring such deposits for an asset 2 may thereby discouraging consumer 6 from using asset 2 where a deposit is required. Further or alternatively, consumer 6 may not wish to provide personal information such as a name, phone number, email address, street address or the like to borrow asset 2 at that time and requiring such personal information may thereby discourage consumer 6 from using asset 2 where such personal information is required.

Figure 2:
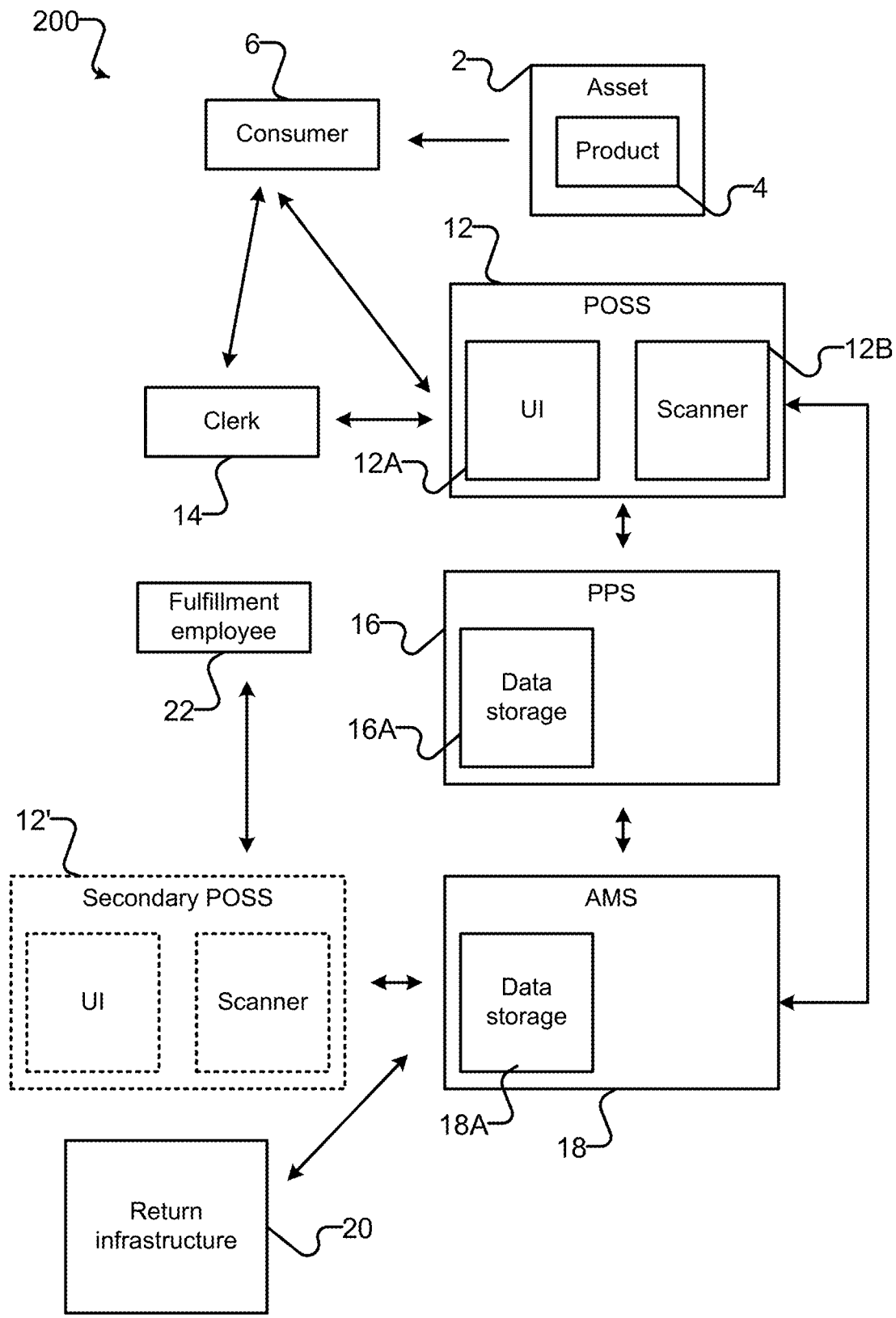
FIG. 2 is a schematic diagram of a system for managing distribution of an asset in association with a transaction for purchase of a product according to one embodiment of the invention.

One aspect of the invention provides a method of managing distribution of an asset in association with a transaction for purchase of a product. FIG. 1 is a block diagram of an exemplary method 100 of managing distribution of an asset 2 in association with a transaction 50 for purchase of a product 4 according to one embodiment of the invention. FIG. 2 is a schematic depiction of an exemplary system 200 for implementing method 100 of FIG. 1 although it should be understood that method 100 could be implemented using other systems. FIG. 2 depicts a point of sale system (POSS) 12, a payment processing system (PPS) 16 and an asset management system (AMS) 18.

POSS 12 may comprise any suitable point of sale system to facilitate obtaining payment for transaction 50 for product 4 by merchant 60. POSS 12 may comprise an in-person point of sale system (e.g., physical) or an online point of sale system (e.g., web-based, mobile application-based or the like). When a consumer 6 makes a purchase, POSS 12 communicates with a payment processing system (e.g., PPS 16) to verify the transaction and obtain authorization. If transaction 50 is approved, POSS 12 updates the transaction status and optionally sends a receipt to consumer 6. POSS 12 may also be integrated with other retail management systems, such as inventory management, customer relationship management, and accounting systems, to provide a comprehensive solution for merchants.

If POSS 12 is an in-person point of sale system, POSS 12 may comprise software and hardware components, such as a computer (mobile phone, tablet or the like), a cash drawer, a scanner (e.g., for scanning barcodes, QR codes, radio frequency identification (RFID) tags such as low frequency RFID tags, high frequency RFID tags, ultra-high frequency RFID tags and near field communication (NFC) tags, or the like), input peripherals (such as a keyboard and/or a mouse), output peripherals (e.g., a printer, speakers, etc.), and/or a customer display screen, that work together to allow, for example, inputting of information regarding product 4, inputting of payment information 120 (discussed further herein) and communication of payment information 120 to a payment processing system (e.g., PPS 16). For example, POSS 12 may comprise a graphical user interface (GUI) 12A and a scanner 12B (e.g., for scanning barcodes, QR codes, RFID tags, NFC tags, or the like). The point of sale system may manage other aspects of the transaction process, including product pricing, inventory management, customer tracking, and financial reporting.

If POSS 12 is an online point of sale system, POSS 12 may comprise primarily or entirely software components which integrate with an online store (e.g., web-based, mobile application-based, etc.) of merchant 60, allowing consumers 6 to make purchases and pay for their purchases using various payment methods, including credit cards, debit cards, electronic checks, cryptocurrency, gift cards, and/or other forms of electronic payment. The online POSS 12 may work by connecting the e-commerce platform of merchant 60 to a payment processing system (e.g., PPS 16).

PPS 16 may comprise any suitable payment processing system used to facilitate electronic transactions between merchants 60 and consumers 6. PPS 16 may securely process payment transactions, including credit cards, debit cards, electronic checks, cryptocurrency, gift cards, prepaid accounts (e.g., cafeteria meal plans such as university or college cafeteria meal plans or workplace meal plans), employee benefit plans, rewards or loyalty program points (e.g., Aeroplan™, Avion Rewards™, Air Miles™ or the like) and other forms of electronic payment. PPS 16 may be employed in various retail environments of merchants 60, including brick-and-mortar stores, online stores, mobile commerce, university cafeterias, workplace cafeterias, etc. PPS 16 may connect POSS 12 to a bank, financial institution, gift card provider, prepaid account system, employee benefit plan system, university cafeteria payment system, etc. to verify and authorize transaction 50. If the transaction is approved, PPS 16 communicates the approval to POSS 12, which then updates the transaction status. PPS 16 may offer integration with other retail management systems, such as inventory management, customer relationship management, and accounting systems, to provide a comprehensive solution for merchants. PPS 16 may comprise a data storage 16A for storing payment information of consumers. PPS 16 may comprise any payment processing system such as, for example, those operated by Stripe™, Square™, Toast™, Clover™, Global Payments™, etc. In some embodiments, POSS 12 is a point of sale system provided by the provider of PPS 16.

AMS 18 may comprise any suitable software and/or hardware-based system configured to, inter alia, manage user accounts, manage and track the distribution, allocation, collection, cleaning, and/or status of assets 2. AMS 18 may use various technologies such as GPS, RFID, or barcode scanning to collect data about assets 2. This information may be stored in a data storage 18A and can be accessed and analyzed by authorized personnel to help make informed decisions about the management and deployment of assets 2.

POSS 12, PPS 16 and/or AMS 18 may communicate with each other by any suitable technique. POSS 12, PPS 16 and/or AMS 18 may communicate with each other wirelessly and/or by wired connection. POSS 12, PPS 16 and/or AMS 18 may communicate with each other via suitable software (e.g., suitable application programming interfaces (APIs) or the like).

In some embodiments, POSS 12 may be integrated with PPS 16 but this is not mandatory and POSS 12 may be separate from PPS 16. In some embodiments, AMS 18 may be integrated into POSS 12 or PPS 16 but this is not mandatory and AMS 18 may be separate from POSS 12 and/or PPS 16. In some embodiments, AMS 18 may be operated by a separate legal entity from POSS 12 and/or PPS 16.

Method 100 may be implemented in conjunction with transaction 50 for product 4. Method 100 may include providing a consumer 6 with an option to borrow an asset 2 or may start after consumer 6 has indicated a desired to borrow an asset 2. In some embodiments, asset 2 may be a reusable container for product 4 such that product 4 is delivered to consumer 6 in asset 2 (e.g., asset 2 may comprise a reusable coffee cup and product 4 may comprise coffee such that the coffee is provided to consumer 6 in the reusable coffee cup).

Consumer 6 may indicate their desire to borrow asset 2 and purchase product 4 in an in-person setting by, for example:
- verbally (or otherwise) indicating to a clerk 14 their intent to purchase product 4 and borrow asset 2;
- bringing product 4 and asset 2 to a checkout counter or self-checkout counter at a retail store, restaurant, cafeteria, canteen or the like (e.g., where product 4 is already packaged in asset 2 or where they product 4 and asset 2 are provided separately);
- bringing product 4 to a self-checkout counter at a retail store, restaurant, cafeteria, canteen or the like and requesting asset 2 at the time of checkout through a POSS of the self-checkout or otherwise;
- choosing product 4 and asset 2 on a physical POSS 12 (e.g., by using GUI 12A);
- choosing product 4 and asset 2 from a vending machine;
- etc.

Consumer 6 may indicate their desire to borrow asset 2 and purchase product 4 in an online setting by, for example:
- putting product 4 and asset 2 in an online shopping cart of a website, mobile application, or the like;
- putting product 4 in an online shopping cart of a website, mobile application, or the like and selecting an option to borrow asset 2;
- purchasing product 4 and selecting asset 2 through one-click purchasing such as making a purchase via Amazon™;
- etc.

Method 100 may begin at any one of blocks 102, 116 or 128. In some embodiments, one or more of blocks 102, 116 and 128 occur substantially simultaneously. In some embodiments, the occurrence of a first branch of method 100 comprising of blocks 102 and 106 occurs in series with a second branch of method 100 comprising of blocks 116, 108, 118, 122 and 124 and/or a third branch of method 100 comprising of block 128. It should be understood that the order of occurrence of the first, second and third branches of method 100 may be varied without departing from the scope of the invention and that the occurrence of at least a portion of one or more of the first, second and third branches of method 100 may overlap temporally. For convenience, the first branch of method 100 will be described first but it should be understood that this does not require that the first branch of method 100 occurs prior to the second and/or third branches of method 100.

At block 102, consumer 6 is presented with a prompt 102A comprising at least a portion of the terms of an agreement 104. Prompt 102A may comprise any suitable prompt. For example, where method 100 is occurring in-person (e.g., not online), prompt 102A may be displayed on GUI 12A of POSS 12, prompt 102A may be an oral or verbal prompt from a clerk 14 of merchant 60 to consumer 6, prompt 102A may be posted on a physical or digital sign board visible to consumer 6 or otherwise. Where method 100 is occurring online, prompt 102A may be displayed in text in a web browser (or in a temporary window or dialogue of the web browser), in text within a mobile application, or by audio from a web browser, mobile application or the like.

Figure 3:
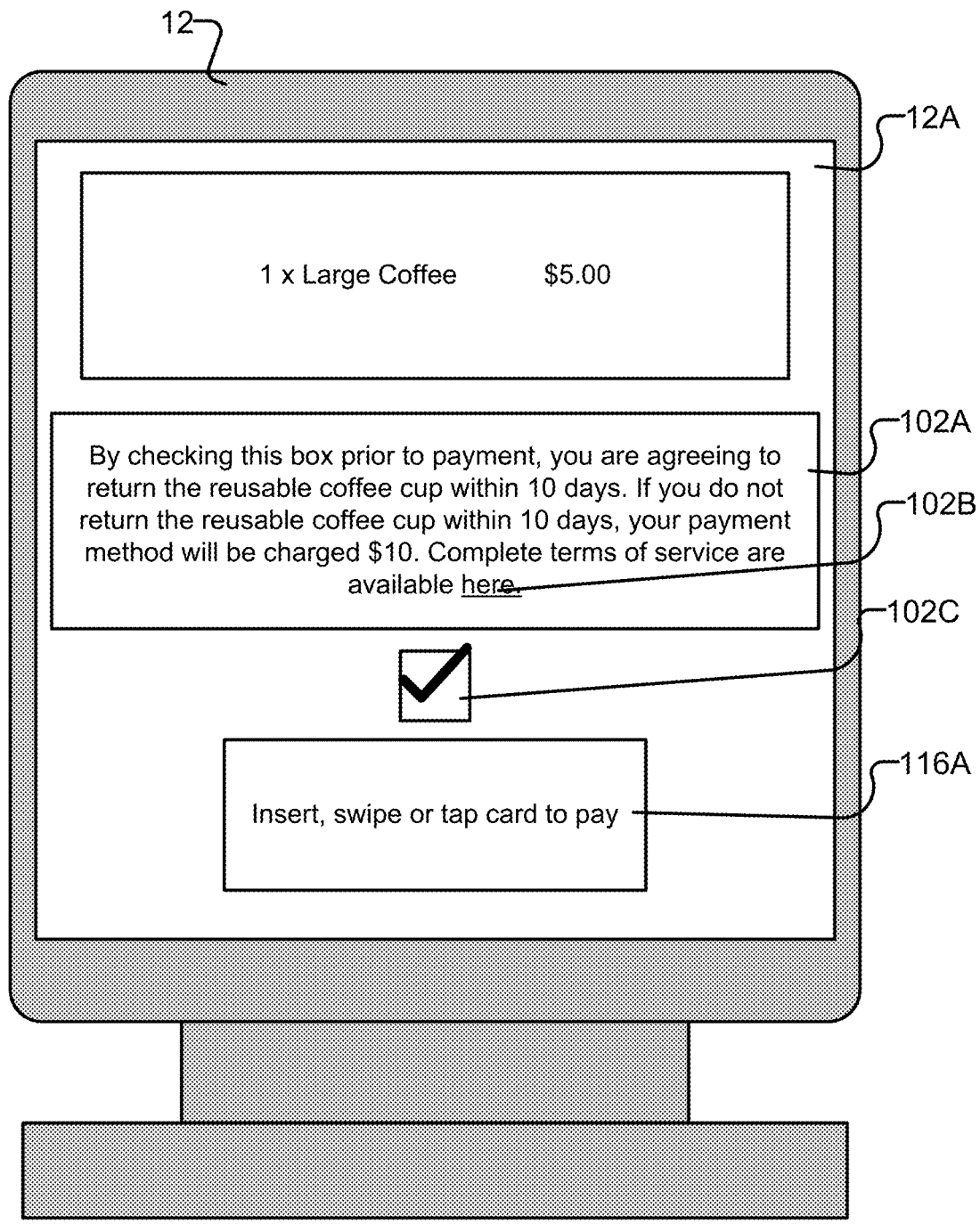
FIG. 3 is a schematic diagram of an exemplary graphical user interface of a point of sale system of the system of FIG. 2.

At block 102, prompt 102A may comprise at least a portion of agreement 104. Agreement 104 may govern the borrowing of asset 2 by consumer 6. For example, agreement 104 may set out a penalty 110 (e.g., a financial penalty) to be charged if asset 2 is not returned (as discussed further herein) within a term 112 (e.g., period of time), how to return asset 2 (e.g., via return infrastructure 20), circumstances in which penalty 110 may be at least partially refunded upon return of asset 2 after term 112 has expired, penalties for damage, etc. Prompt 102A may include all terms of agreement 104 or just a portion of agreement 104. In some embodiments, where less than the entirety of agreement 104 is included in prompt 102A, further terms or details of agreement 104 may be made available to consumer 6 elsewhere (e.g., by selecting a link 102B displayed in the block 102 prompt as shown in FIG. 3, by making a request to clerk 14, on a hardcopy located nearby, etc.). Agreement 104 may be a smart contract registered or registerable on a blockchain or distributed ledger such that once accepted, agreement 104 is automatically executed based on one or more events occurring (or expected to occur) during method 100.

FIG. 3 is a schematic depiction of an exemplary prompt 102A displayed on GUI 12A of an exemplary POSS 12 according to an exemplary embodiment of the invention. As can be seen from FIG. 3, consumer 6 has indicated that they would like to purchase a large coffee (i.e., product 4) for $5.00, term 112 is 10 days and penalty 110 is $10.

Penalty 110 may be a fiat currency penalty (e.g., payable by credit card, debit card, mobile payment, electronic cheque, e-transfer, digital wallet, etc.) but this is not mandatory. In some embodiments, penalty 110 comprises a cryptocurrency penalty or a penalty against a balance of a gift card, prepaid account, prepaid payment card, cafeteria meal plan, employee benefit plan, rewards or loyalty program or the like. Penalty 110 may be a fixed amount payable once but this is not mandatory. Penalty 110 may be a recurring late fee that continues to accrue until asset 2 is returned or a recurring late fee that is charged on a regular basis until asset 2 is returned. The magnitude of penalty 110 may depend on the replacement value of asset 2 (e.g., if asset 2 is a reusable coffee cup, then penalty 110 may be less expensive than if asset 2 is a reusable container for an entire meal), damage to asset 2, the length of term 112, prior borrowing history of consumer 6, the location or time of transaction 50, etc. In some embodiments, penalty 110 is not fixed and may be dependent on how long it takes to return asset 2. In some embodiments, agreement 104 optionally sets out that at least a portion of penalty 110 charged to consumer 6 on failure to return asset 2 within term 112 may be refunded to consumer 6 upon return of asset 2 outside of term 112. Penalty 110 may be determined at least in part on a past history of borrowing assets 2 of consumer 6. Penalty 110 may be determined based at least in part on the nature of product 4, details of consumer 6, consumer demand for asset 2, contextual factors and/or pre-set penalties for each product 4.

The length of term 112 may be any suitable amount of time. In some embodiments, term 112 is dependent on the type of product 4 to be provided within asset 2. For example, where product 4 is quickly consumable or expected to be consumed on the spot (e.g., a coffee or a beer), then term 112 may be relatively shorter. In contrast, where product 4 is slowly consumable or expected to be consumed at another location (e.g., shampoo), then term 112 may be relatively longer. Term 112 may be determined at least in part on a past history of borrowing assets 2 of consumer 6. Term 112 may be determined at least on consumer demand for asset 2 at the time of borrowing or predicted consumer demand for asset 2 at a later time. Term 112 may be determined based at least in part on the nature of product 4, past, present or predicted consumer behaviour related to product 4, and/or pre-set terms 112 for each product 4.

After or during block 102, consumer 6 may be provided with an opportunity to accept agreement 104. Consumer 6 may accept agreement 104 in any suitable manner. For example, where method 100 occurs in person, consumer 6 may accept agreement 104 by selecting an option displayed on GUI 12A of POSS 12 (e.g., by checking box 102C as shown in FIG. 3), by orally confirming acceptance to clerk 14 (which may be recorded), by signing a physical copy of agreement 104, by providing a digital signature via GUI 12A of POSS 12 or otherwise, by proceeding to provide payment information 120 (as discussed further herein), etc. In some embodiments, consumer 6 may accept agreement 104 via a secondary POSS 12' connected to AMS 18 rather than POSS 12, a mobile device of consumer 6 in communication with AMS 18 or another device.

In some embodiments, consumer 6 may provide a blanket acceptance of future agreements 104 such that consumer 6 does not need to re-accept agreement 104 each time they borrow an asset 2 according to method 100. The blanket acceptance of future agreements 104 may provide that future agreements 104 all have the same term 112 and penalty 110 or may allow for different terms 112 and penalties 110. For example, during a first time that consumer 6 participates in method 100, they may provide acceptance of future agreements 104 such that blocks 102 and 106 may be skipped on subsequent occurrences of method 100 where consumer 6 is participating. Consumer 6 may identify themselves as having previously accepted agreement 104 using any suitable method. For example, consumer 6 may provide some sort of identification such as an account number/name, user ID, payment information 120, etc. which may be provided by any suitable input means (e.g., by RFID, by scanning a barcode or QR code, by visual inspection by clerk 14, by inputting through a GUI such as GUI 12A, etc.) and their identification may cross-referenced with an indication that they have previously indicated agreement 104 stored in data storage 18A of AMS 18. As another example, consumer 6 may identify themselves by presenting a previously borrowed asset 2 which is associated with their consumer identifier 126 such that by obtaining asset identifier 130 of the previously borrowed asset 2, consumer identifier 126 of consumer 6 may be determined (e.g., by cross-referencing of asset identifier 130 of the previously borrowed asset 2 and consumer identifier 126 in data storage 18A of AMS 18) and blanket acceptance of agreement 104 may be confirmed.

At block 106, it is determined whether or not consumer 6 has accepted agreement 104. The block 106 determination may be made by, for example, clerk 14, POSS 12, PPS 16 and/or AMS 18. If at block 106, it is determined that consumer 6 did not accept agreement 104, then method 100 ends. For example, at block 106, if clerk 14 does not receive oral acceptance of agreement 104, then clerk 14 can end method 100. As another example, if POSS 12 does not receive an indication of acceptance of agreement 104, then POSS 12 can end method 100. As yet another example, if PPS 16 does not receive indication of acceptance of agreement 104 (e.g., as indicated by receipt of payment information 120 at PPS 16), then PPS 16 can end method 100. If at block 106, it is determined that consumer 6 did accept agreement 104, then method 100 may continue to block 132 as discussed further herein.

Returning back to the second branch of method 100, block 116 comprises presenting consumer 6 with a prompt 116A for payment for product 4. Payment for product 4 may solely be a payment for product 4 such that, as long as asset 2 is returned according to the terms of agreement 104, consumer 6 does not directly incur any expense to borrow asset 2. For example, as long as asset 2 is returned according to the terms of agreement 104, the cost to consumer 6 of product 4 may be the same whether they choose to borrow asset 2 or not. Instead, merchant 60 may cover the cost of borrowing asset 2 as part of the revenue received by the sale of product 4 to consumer 6 (or otherwise). In some embodiments, payment for product 4 may also include a deposit for asset 2 that is refundable upon return of asset 2. As discussed above, block 116 may occur before block 102, substantially concurrently with block 102 or after block 102 (e.g., during or after the occurrence of the blocks of the first branch of method 100).

Prompt 116A may indicate various ways in which consumer 6 can pay for product 4. For example, prompt 116A may indicate that a user can pay with any suitable payment type (e.g., credit card, debit card, mobile payment, electronic cheque, e-transfer, digital wallet, cryptocurrency, gift card, prepaid account, meal plan, prepaid payment card, etc.). The payment information 120 (e.g., the credit card or debit card number, expiration date and security code, digital wallet identifier, or the like) associated with such payment type may be provided to POSS 12 by any suitable method. For example, payment information 120 may be provided to POSS 12 by manually inputting payment information 120 through GUI 12A or another peripheral of POSS 12, by swiping a payment card in a scanner 12B of POSS 12, by inserting at least a portion of a payment card into scanner 12B of POSS 12, by wireless communication (e.g., "tapping") between a card, smartphone, smartwatch, or other form of mobile payment and scanner 12B of POSS 12, by completing an e-commerce transaction (e.g., by selecting "complete purchase" or "buy") which authorizes use of payment information by the e-commerce platform, etc.

In some embodiments, consumer 6 has previously provided payment information 120 to PPS 16 and/or AMS 18 and payment information 120 is stored by PPS 16 and/or AMS 18 for future use such that consumer 6 does not need to provide payment information 120 again (such that one or more of blocks 116, 122 and 124 may be skipped). Instead, consumer 6 may merely need to identify themselves using any suitable method and payment information 120 associated with consumer 6 may be retrieved (e.g., by PPS 16). For example, consumer 6 may provide some sort of identification such as an account number/name, user ID, payment information 120, etc. which may be provided by any suitable input means (e.g., by RFID, by scanning a barcode or QR code, by visual inspection by clerk 14, by inputting through a GUI such as GUI 12A, etc.). As another example, consumer 6 may identify themselves by presenting a previously borrowed asset 2 which is associated with their consumer identifier 126 such that by obtaining asset identifier 130 of the previously borrowed asset 2, consumer identifier 126 of consumer 6 may be determined (e.g., by cross-referencing of asset identifier 130 of the previously borrowed asset 2 and consumer identifier 126 in data storage 18A of AMS 18).

Prompt 116A may comprise any suitable prompt. For example, where method 100 is occurring in-person (e.g., not online), prompt 116A may be displayed on GUI 12A of a point of POSS 12, prompt 116A may be an oral prompt by a clerk 14, prompt 116A may be posted on a physical or digital sign board visible to consumer 6 or otherwise. Where method 100 is occurring online, prompt 116A may be displayed in text in a web browser (or in a temporary window or dialogue of the web browser), in text within a mobile application, or by audio from a web browser, mobile application or the like. FIG. 3 depicts an exemplary prompt 116A displayed on GUI 12A of an exemplary POSS 12.

Figure 4:
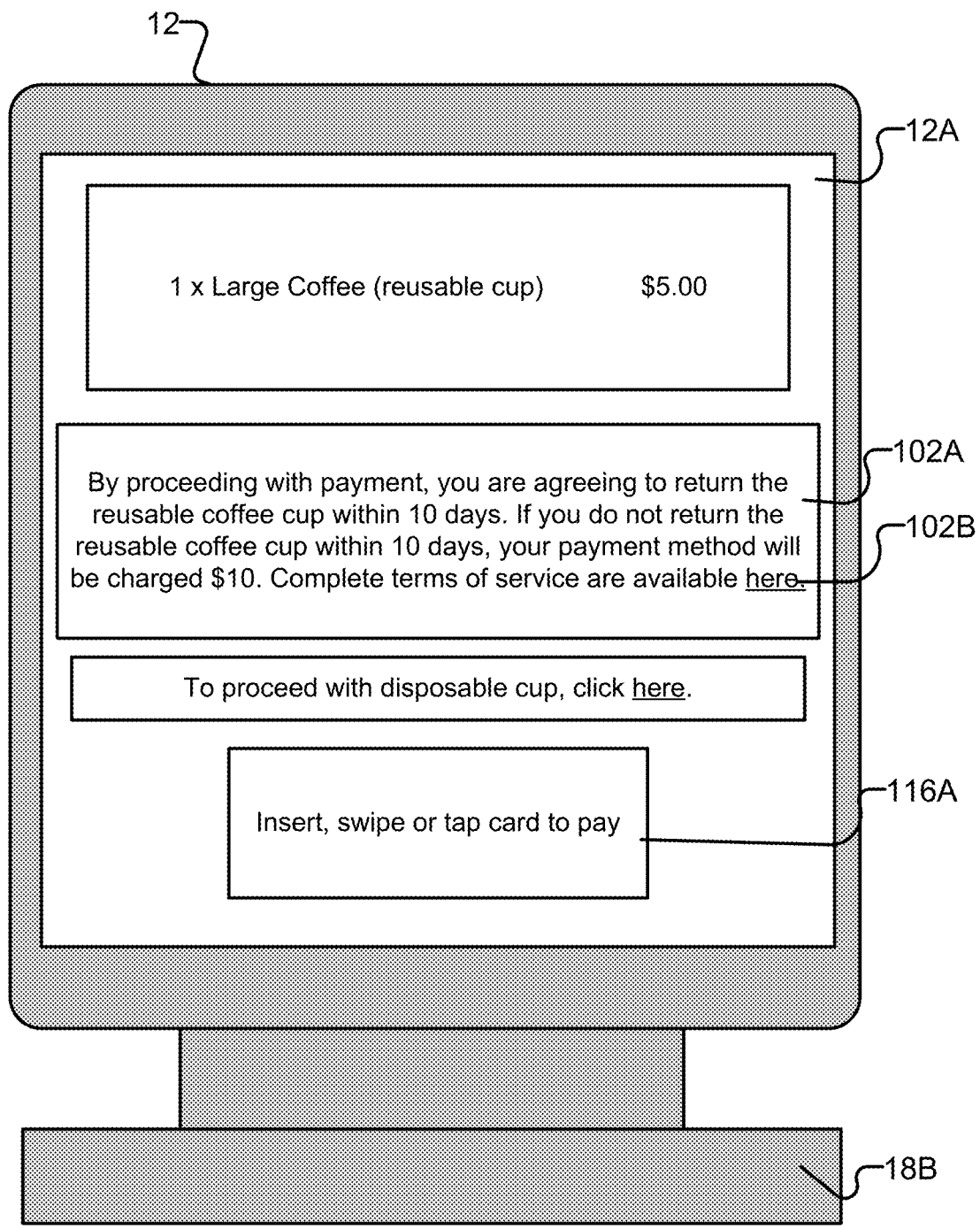
FIG. 4 is a schematic diagram of another exemplary graphical user interface of a point of sale system of the system of FIG. 2.

FIG. 4 is a schematic depiction of further exemplary prompts 102A and 116A displayed on GUI 12A of an exemplary POSS 12 according to an exemplary embodiment of the invention. As can be seen from FIG. 4, consumer 6 has indicated that they would like to purchase a large coffee (i.e., product 4) in a reusable cup (i.e., asset 2) for $5.00. Unlike the FIG. 3 embodiment, consumer 6 is prompted (e.g., at block 102) to agree to agreement 104 set out at least in part in prompt 102A by proceeding with payment which may be accomplished as indicated in prompt 116A (e.g., at block 116 which is occurring substantially simultaneously with block 102). In this way, consumer 6 can provide their acceptance of agreement 104 and payment information 120 in a single step thereby facilitating (e.g., simplifying) the borrowing of asset 2.

If payment information 120 is provided (e.g., in response to block 116), payment information 120 may be transferred to PPS 16 to complete the payment for transaction 50 for product 4 at block 108. Alternatively, if consumer 6 identifies themselves as someone who has previously provided payment information 120, payment information 120 associated with their consumer identifier 126 may be retrieved by PPS 16 or AMS 18 and processed at block 108 to complete the payment for transaction 50 for product 4.

At block 118, it is determined whether or not payment with payment information 120 was successfully processed at block 108 or confirmed at block 108 as having previously occurred in the case that product 4 was previously paid for is included as part of a meal plan or the like. The block 118 determination may be made by, for example, clerk 14, POSS 12 or PPS 16. If at block 118, it is determined that payment did not occur (e.g., due to insufficient funds linked to payment information 120), then method 100 ends. If at block 118, it is determined that consumer 6 did provide payment information 120 and PPS 16 was able to process payment for product 4 with payment information 120, then method 100 may continue to block 122.

Together, blocks 116, 108 and 118 and delivery of product 4 to consumer 6 comprise transaction 50 for purchase of product 4.

At block 122, payment information 120 is stored in a data storage 16A of PPS 16 (or in a data storage of POSS 12, or AMS 18). Data storage 16A may be a secure data storage having appropriate security measures for storing payment information 120. In some embodiments, payment information 120 is pre-authorized in the amount of penalty 110 (e.g., to ensure that funds for penalty 110 are available at the end of term 112) but this is not mandatory.

At block 124, payment information 120 may be associated with a unique consumer identifier 126. Block 124 may occur substantially concurrently, before or after block 122 such that payment information 120 is stored in data storage 16A in association with consumer identifier 126. Consumer identifier 126 may comprise a name of consumer 6 but this is not mandatory. For example, consumer identifier 126 may comprise a randomly generated string of characters (e.g., alphanumeric characters or the like). Consumer identifier 126 could be a "user ID". In some embodiments, a consumer 6 may have multiple instances of payment information 120 (e.g., payment information for a first credit card, a second credit card, a debit card, a mobile payment device, etc.) associated with a single consumer identifier 126. In other embodiments, each unique instance of payment information 120 has its own consumer identifier 126. As will become evident, associating consumer identifier 126 with payment information 120 allows PPS 16 to communicate with AMS 18 about payment information 120 and consumer 6 without actually sharing payment information 120 between PPS 16 and AMS 18 which would otherwise introduce security risks and/or require AMS 18 to incorporate security measures and/or regulatory oversight which may undesirable and/or costly.

Returning back to the third branch of method 100, block 128 comprises determining an asset identifier 130 for the instance of asset 2 subject of method 100. As discussed above, block 128 may occur before one or more of blocks 102 and 116, substantially concurrently with one or more of blocks 102 and 116 or after one or more of blocks 102 and 116 (e.g., during or after the occurrence of the blocks of the first and/or second branches of method 100).

Asset identifiers 130 may be provided for all assets 2 prior to allowing such assets 2 to be borrowed according to method 100. Alternatively, a new asset identifier 130 is generated at the time of purchase of product 4 and is associated with the asset 2 being borrowed at that time. Asset identifiers 130 may comprise at least in part a type of class of an asset 2 (e.g., "coffeecup" or "coffeecup1") but this is not mandatory. For example, asset identifier 130 may comprise a randomly generated string of characters (e.g., alphanumeric characters or the like). Unique asset identifiers 130 may be provided for each asset 2 such that two otherwise identical assets 2 could be uniquely identifiable. Alternatively, all assets 2 of a particular type or class could have the same asset identifier 130.

Asset identifiers 130 may be associated with assets 2 using various techniques. Asset identifiers 130 may be printed directly onto surfaces of assets 2. Asset identifiers 130 may be printed on stickers or the like adhered to surfaces of assets 2. Asset identifiers 130 may be represented by barcodes, QR codes, etc. printed on asset 2 (or printed on stickers adhered to asset 2). Asset identifiers 130 may be represented by RFID tags such as near-NFC tags or the like adhered to or otherwise incorporated into assets 2. Asset identifiers 130 may be represented by unique physical arrangements of material microstructures (e.g., unique physical arrangements of steel grain structure) or macrostructures.

At block 128, the asset identifier 130 for asset 2 subject of method 100 may be determined automatically or manually. For example, where the purchase of product 4 is occurring in-person, consumer 6 or clerk 14 may input asset identifier 130 into POSS 12 (e.g., by scanning a representation of asset identifier 130 with scanner 12B of POSS 12 or another scanner) or by typing asset identifier 130 into POSS 12 (e.g., via a keyboard or GUI 12A). Alternatively, a secondary scanner or secondary POSS 12' may be provided, as shown in FIG. 1, for obtaining asset identifier 130 and sending asset identifier 130 to AMS 18. Asset identifier 130 may be obtained from an ordered list of asset identifiers 130 wherein the ordered list corresponds in order to a stock of assets 2 (e.g., such that an asset identifier 130 of an asset 2 pulled from the top of a pile or stack matches the asset identifier 130 at the top of the ordered list).

Where a plurality of assets 2 are stocked (e.g., in one or more stacks) in an area (e.g., on a shelf or in a cabinet), one or more sensors or scanners may be provided to keep track of the asset identifiers 130 of assets 2 in the stack such that it can be determined which assets 2 are present and which are not. This may facilitate corresponding an asset identifier 130 to a transaction 50. For example, where assets 2 have RFID tags, an RFID scanner may be employed to keep track of the inventory of assets 2 in the presence of the scanner. In this way, if an asset 2 is removed from inventory, the asset identifier 130 of that asset 2 may no longer be present and AMS 18 may infer that such asset 2 corresponds to a particular transaction 50.

Block 128 may not occur until the time at which the purchase of product 4 is being fulfilled (e.g., the time at which product 4 is inserted into asset 2 so that product 4 can be delivered to consumer 6) in which case a fulfillment employee 22 or clerk 14 may input asset identifier 130 at the time of fulfillment rather than at the time of ordering. For example, where consumer 6 requests a coffee (product 4) in a reusable coffee cup (asset 2) as consumer 5 placed their order at a coffee shop, the unique asset 2 may not be chosen and associated with transaction 50 until a few moments later when a fulfilment employee 22 (e.g., a barista) takes a reusable coffee cup (asset 2) from storage and makes the coffee. Similarly, consumer 6 may order a product 4 and asset 2 online at a first time (e.g., via a mobile app), the unique asset 2 may not be chosen and associated with transaction 50 until a fulfillment employee 22 physically gathers product 4 and asset 2 for delivery to consumer 6 at a later time (e.g., minutes, hours or days later).

At block 132, transaction information 134 is obtained and stored by AMS 18. Transaction information 134 may comprise one or more of penalty 110, term 112, acceptance 114, consumer identifier 126 and asset identifier 130. In some embodiments, one or more of penalty 110, term 112, acceptance 114, consumer identifier 126 and asset identifier 130 are received by AMS 18 concurrently at block 132 but this is not mandatory. For example, each of the one or more of penalty 110, term 112, acceptance 114, consumer identifier 126 and asset identifier 130 received at block 132 may be received as they become available (e.g., as the first, second and third branches of method 100 are completed). In some embodiments, transaction information 134 does not include payment information 120 such that consumer 6 can be confident that payment information 120 will not be undesirably used or stored by the proprietor of AMS 18 and/or AMS 18 may not require the type of security typically required for storing payment information 120.

In some embodiments, transaction information 134 comprises each of penalty 110, term 112, acceptance 114, consumer identifier 126 and asset identifier 130, but this is not mandatory. For example, in some embodiments, transaction information 134 only comprises consumer identifier 126 and asset identifier 130. In some embodiments, AMS 18 may derive one or more of penalty 110, term 112 and acceptance 114 from consumer identifier 126 and/or asset identifier 130 and/or other information about asset 2 received at block 132. For example, penalty 110 and/or term 112 may be determined by AMS 18 based at least in part on asset identifier 130 (e.g., penalty 110 and/or term 112 may be based on the type of asset 2 represented by asset identifier 130). In some embodiments, penalty 110 and/or term 112 may be determined by AMS 18 based at least in part on other information related to the purchase of product 4 (e.g., the nature of product 4, where the purchase of product 4 was made, the time of the purchase of product 4, etc.) that may be provided to AMS 18 as part of transaction information 134. In some embodiments, AMS 18 may determine that acceptance of agreement 104 has occurred due to receipt of consumer identifier 126 (e.g., because consumer identifier 126 is provided to AMS 18, it is implicitly determined that consumer 6 accepted agreement 104 at block 106).

At block 136, transaction information 134 is stored in a data storage 18A of AMS 18. Data storage 18A may be separate from data storage 16A (e.g., stored in different physical locations, stored on different servers, stored on different storage devices, separated within a common storage device, stored by separate organizations, etc.). Since data storage 18A of AMS 18 may not receive payment information 120, data storage 18A may employ lesser (e.g., less costly) security protocols than data storage 16A of PPS 16, which does receive payment information 120.

Where elements of transaction information 134 are received separately by AMS 18, block 136 may comprise associating such elements with one another (e.g., a consumer identifier 126 received at the time of placing an order may be associated with asset identifier 130 received after fulfillment of the order). Elements of transaction information 134 may be associated with one another based on a transaction number provided to AMS 18 in association with each element, based on context (time of receipt, from which merchant 60 the information is received, the nature of product 4 and the nature of asset 2, etc.) or by other suitable means.

In some embodiments, AMS 18 employs consumer identifier 126 to identify consumer 6 but this is not mandatory and AMS 18 may alternatively generate its own identifier for consumer 6. An identifier for consumer 6 generated by AMS 18 may be related to a single consumer identifier 126 or multiple consumer identifiers 126 (e.g., where a single consumer 6 uses or has used multiple forms of payment). In some embodiments, PPS 16 and/or AMS 18 may determine that multiple forms of payment (e.g., multiple instances of payment information 120) belong to a single consumer 6 and may associate multiple instances of payment information 120 with consumer identifier 126 (or an identifier generated by AMS 18). In some embodiments, determining that multiple forms of payment belong to a single consumer 6 comprises cross-referencing a database of customer information and payment information for one or more payment types (e.g., for a single credit card issuer or for multiple credit card issuers). This database may be maintained by PPS 16, AMS 18, POSS 12, merchant 60 or a third party.

Transaction information 134 may be associated with other information of consumer 6. For example, consumer 6 may optionally provide further information such as, for example, their name, address, email address, social media handles, phone number, preferences, etc. which may be stored in data storage 16A with transaction information 134. Consumer 6 may provide this information via a website, mobile application or the like associated with AMS 18. Consumer 6 may provide this information at the time of transaction 50 (e.g., via clerk 14, POSS 12 or otherwise). Transaction information 134 may be associated with historical transaction information of consumer 6 if consumer 6 has borrowed one or more assets 2 previously.

At block 138, AMS 18 monitors for a return of asset 2 with the asset identifier 130 input at block 128. Block 138 may be a passive or active step. In some embodiments, AMS 18 takes no action at block 138 unless asset 2 with identifier 130 is returned. For example, monitoring for the return of asset 2 may comprise merely allowing time to pass. In other embodiments, AMS 18 may actively search for asset 2 with identifier 130 (e.g., by tracking a tracking beacon attached to or integrated into asset 2).

Asset 2 may be returned using any suitable technique or return infrastructure 20. For example, asset 2 may be returned to clerk 14 (e.g., by handing asset 2 to clerk 14 or by placing asset 2 in a receptacle or on a counter near clerk 14), by placing asset 2 in a designated location (e.g., a receptacle), by returning asset 2 to a head office of the operator of AMS 18, by placing asset 2 in a mailbox (e.g., where asset 2 has prepaid postage or similar) or any other suitable means. Asset 2 may be returned by consumer 6 or by another person that comes into possession of asset 2.

The return of asset 2 may be tracked by inputting asset identifier 130 into POSS 12 (e.g., if returned at the point of borrowing), secondary POSS 12' or a similar POSS located at the location of return or at a centralized return location where returns from various locations are tracked. Asset identifier 130 may be inputted into a POSS (e.g., POSS 12) using any suitable technique, such as the techniques described herein in relation to block 128. The return of asset 2 may be tracked automatically where return infrastructure 20 includes a scanner for reading asset identifier 130 and a network connection to AMS 18 for communicating which assets 2 have been returned (e.g., where asset 2 is dropped into a network connected receptacle with an integrated scanner for reading asset identifier 130). The return of asset 2 may be tracked by consumer 6 submitting to AMS 18 a photo, video or the like of asset 2 being returned to a designated location or receptacle.

In some embodiments, such as, but not limited to, where asset identifier 130 is not unique to asset 2 (e.g., a single asset identifier 130 is provided for a class of assets 2 such as coffee cups), consumer 6 may identify themselves at the time of return to facilitate determining who has returned asset 2. For example, consumer 6 may be prompted to provide some sort of identification at the time of return of asset 2 such as an account number/name, user ID, receipt of borrowing, payment information 120, etc. which may be provided by any suitable input means (e.g., by RFID, by scanning a barcode or QR code, by visual inspection by clerk 14, by inputting through a GUI such as GUI 12A, etc.). Alternatively, AMS 18 may determine which consumer identifier 126 is associated with an asset 2 having a generic asset identifier 130 through context (e.g., when and where returned, type of asset 2, etc.).

At block 140, if asset 2 has not been returned (i.e., a "no" determination), method 100 continues to block 142 and AMS 18 determines whether or not term 112 has elapsed. If term 112 has not elapsed (i.e., a "no" determination), then method 100 returns to block 138. If term 112 has elapsed (i.e., a "yes" determination), method 100 continues to block 144.

At block 144, AMS 18 requests payment of penalty 110 by consumer 6. AMS 18 may send such a request for payment of penalty 110 by consumer 6 to PPS 16 by suitable communication (e.g., via an API or the like). This communication may comprise consumer identifier 126 and the magnitude of penalty 110 to be charged to consumer 6. PPS 16 may then retrieve payment information 120 stored by PPS 16 which corresponds to consumer identifier 126 so that it may process a payment for penalty 110 with payment information 120 which was stored in data storage 16A at block 122. PPS 16 may provide a report to AMS 18 when the payment for penalty 110 for consumer identifier 126 is completed. PPS 16 may provide a report to consumer 6 when the payment for penalty 110 for consumer identifier 126 is completed. For example, PPS 16 may email consumer 6 with a receipt for payment of penalty 110 at an email address collected as part of transaction 50 or previously by PPS 16.

At block 146, AMS 18 receives confirmation of payment for penalty 110 for consumer identifier 126 is completed. Optionally, AMS 18 may send a communication to consumer 6 confirming that penalty 110 has been paid at block 146. AMS 18 may optionally continue to monitor for return of asset 2 at block 138.

Returning to block 140, if asset 2 has been returned (i.e., a "yes" determination), then method 100 continues to block 148. If, at block 148, term 112 has not elapsed (i.e., a "no" determination), then method 100 may end or continue to optional block 150. Optionally, AMS 18 may send a communication to PPS 16 that penalty 110 is not to be charged using payment information 120. If a deposit for asset 2 was charged or pre-authorized using payment information 120 (e.g., as part of transaction 50), then AMS 18 may send a request to PPS 16 to refund the deposit or release the pre-authorization upon a "yes" determination at block 148.

Optionally, if it is determined when asset 2 is returned that asset 2 has sustained damage, consumer 6 may be charged with a damage penalty following similar steps to those set out in blocks 144 and 146.

At block 150, data from method 100 (e.g., transaction information 134, the borrowing time, date and/or location of asset 2, the return time, date and/or location of asset 2, details of product 4, details of merchant 60, other information associated with transaction information 134, etc.) may be stored in a data storage of AMS 18 (e.g., data storage 18A or a separate data storage). Such data may be used for various purposes such as, but not limited to:
- providing rewards to consumer 6;
- determining whether consumer 6 should be allowed to continue to borrow assets 2;
- determining future penalties 110 and terms 112 for consumer 6 if further assets 2 are borrowed;
- determining how to distribute assets 2;
- determining whether or not to obtain more assets 2 for distribution; and/or
- otherwise.

Returning to block 148, if term 112 has elapsed (i.e., a "yes" determination), then method 100 may end (or proceed to block 150). Alternatively, if, at block 148, term 112 has elapsed and penalty 110 (or a deposit) has already been paid by consumer 6, then, if agreement 104 provides for it, method 100 may continue to block 152 where at least a portion of penalty 110 (or the deposit) is refunded to consumer 6. For example, at block 152, if penalty 110 has already been paid by consumer 6 pursuant to the request at block 144 and agreement 104 provides for it, then AMS 18 may send a request to PPS 16 for at least a partial refund of penalty 110 to consumer 6. AMS 18 may send such a request for refund of at least a portion of penalty 110 paid by consumer 6 to PPS 16 by suitable communication (e.g., via an API or the like). This communication may comprise consumer identifier 126 and the magnitude of the portion of penalty 110 to be refunded to consumer 6. PPS 16 may then retrieve payment information 120 stored by PPS 16 which corresponds to consumer identifier 126 so that it may process a refund of the portion of penalty 110 with payment information 120. PPS 16 may provide a report to AMS 18 when the refund for consumer 6 is completed. PPS 16 may provide a report to consumer 6 when the refund for the at least a portion of penalty 110 for consumer identifier 126 is completed at which point method 100 ends (or method 100 proceeds to block 150.

In some embodiments, one or more of blocks 132, 136, 142, 144, 146, 148, 150 and 152 may be executed by PPS 16. To execute such blocks, PPS 16 may need to be updated with certain information (e.g., the determination at block 140 of whether or not asset 2 has been returned, the time of return of asset 2, etc.) which may be provided by AMS 18.

Where agreement 104 comprises a smart contract registered on a distributed ledger or blockchain, one or more of blocks 132, 136, 142, 144, 146, 148, 150 and 152 may be executed by the smart contract by communication with AMS 18 (e.g., by receiving the block 140 determination and related information) and/or PPS 16 (e.g., by sending instructions to PPS 16 according to block 144). To execute such blocks, the smart contract may need to be updated with certain information (e.g., the determination at block 140 of whether or not asset 2 has been returned, the time of return of asset 2, etc.) For example, updating the smart contract with such information may comprise the use of a blockchain oracle, registering the determination at block 140 by AMS 18 on the blockchain in a manner accessible by the smart contract (or accessible by the nodes of the distributed ledger or blockchain on which the smart contract is registered) or by other mechanisms.

As may be evident, one or more blocks of method 100 that occur prior to block 132 may occur without communication between AMS 18 and POSS 12 and/or without communication between AMS 18 and PPS 16 thereby allowing a consumer 6 to borrow an asset 2 even if AMS 18 goes offline due to a power outage, network failure, or the like. In such a situation, blocks 132 and onwards of method 100 may occur at a later time when the network connection is restored (or by some other method of information transfer to AMS 18). Similarly, return infrastructure 20 may accept a return of an asset 2 even if at that moment, communication between return infrastructure 20 and AMS 18 is unavailable. In such a situation, the occurrence of the return of asset 2 may be later reported to AMS 18 (e.g., with a timestamp so that a block 142 determination may be made accurately and/or penalty 110 may be refunded if it has already been wrongfully charged).

Exemplary First Implementation of Method 100

Figure 5:
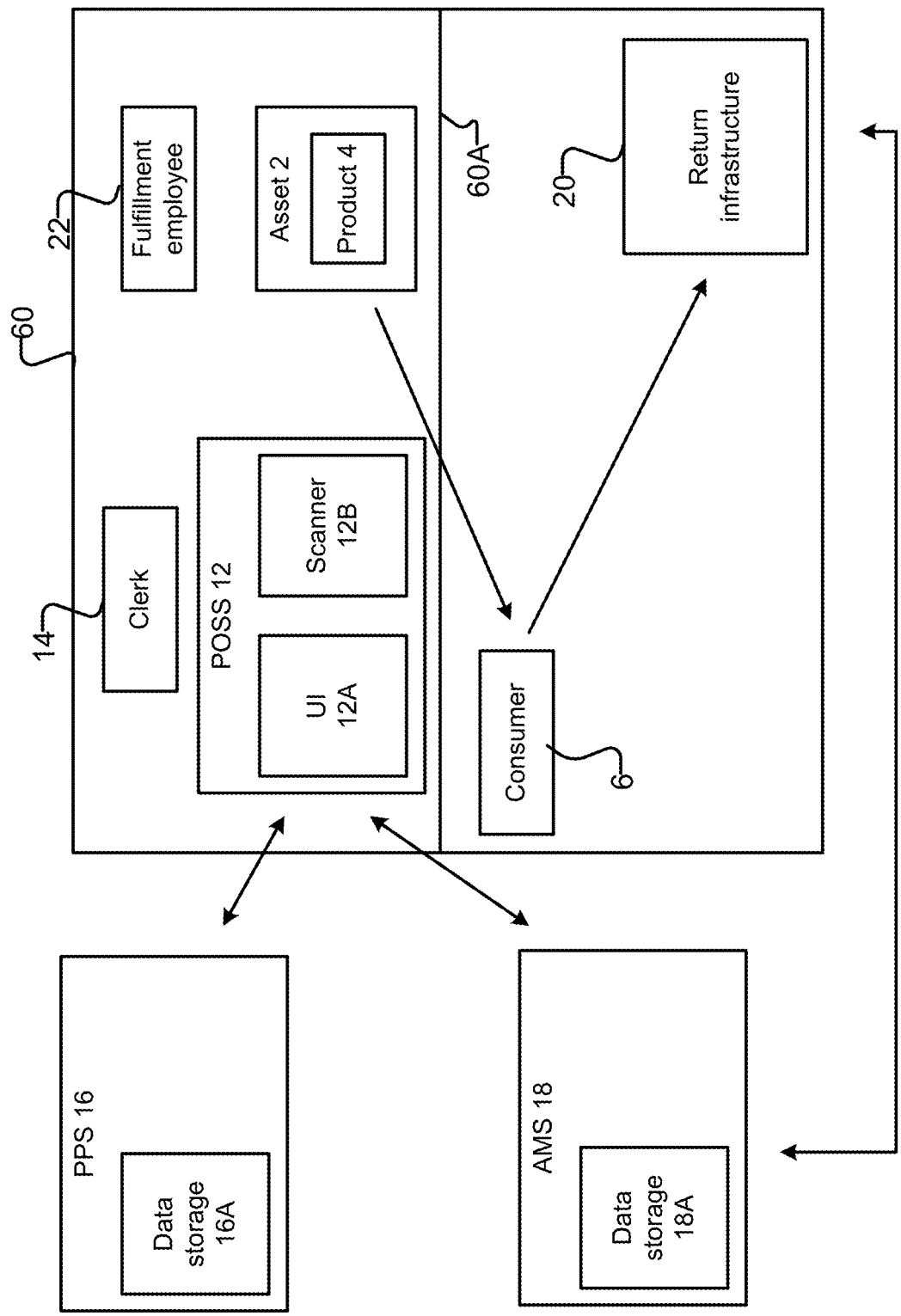
FIG. 5 is a schematic diagram of an exemplary implementation of a method of managing distribution of an asset in association with a transaction for purchase of a product according to one embodiment of the invention.

In a first exemplary non-limiting implementation of method 100 depicted schematically in FIG. 5, a consumer 6 is purchasing a coffee (product 4) at a coffee shop (merchant 60) and wishes for their coffee to be provided in a reusable cup (asset 2).

Prior to the start of method 100 in this first exemplary non-limiting implementation of method 100, consumer 6 approaches an order or checkout area 60A at the coffee shop and requests to order a coffee. Clerk 14 enters the order into POSS 12 and, according to blocks 102 and 116 which occur simultaneously, consumer 6 is presented with GUI 12A of POSS 12 which displays prompt 102A and prompt 116A as shown, for example, in FIG. 3. Consumer 6 reads prompt 102A and prompt 116A and provides acceptance 114 of agreement 104 and payment information 120 through a single action by tapping their RFID enabled credit card on scanner 12B of POSS 12 which obtains payment information 120 of the credit card via this action.

Payment for the coffee is processed by PPS 16 according to block 108 using payment information 120 which is sent to PPS 16 by POSS 12. PPS 16 then stores payment information 120 (e.g., the credit card number, expiry date and security code) in data storage 16A of PPS 16, according to block 122, in association with a pre-existing consumer identifier 126 since consumer 6 has provided payment information 120 to PPS 16 previously, according to block 124.

At any time after the occurrence of a "yes" determination at both block 106 and 118, clerk 14 may provide the details of the order of consumer 6 to fulfillment employee 22 of merchant 60 who may then retrieve the reusable coffee cup from storage (e.g., a stack of clean reusable coffee cups). Fulfillment employee 22 inputs asset identifier 130 of the chosen cup by scanning a QR code on the reusable cup with a scanner attached to POSS 12 according to block 128. Fulfillment employee 22 then proceeds to fill the reusable coffee cup with coffee before handing it to consumer 6.

At block 132, the magnitude of the term 112 (e.g., 10 days as set out in FIG. 3), the penalty 110 (e.g., $10 as set out in FIG. 3), consumer identifier 126 and asset identifier 130 (together comprising transaction information 134) are received by AMS 18 via PPS 16 (although one or more of term 112, penalty 110, consumer identifier 126 and asset identifier 130 may be sent from POSS 12 directly to AMS 18).

At block 136, transaction information 134 is stored in data storage 18A of AMS 18. Transaction information 134 does not include payment information 120, which is instead stored in database 16A of PPS 16. As it happens, consumer 6 has previously borrowed assets 2 using payment information 120 and so transaction information 134 is associated with a pre-existing profile associated with consumer identifier 126 stored in data storage 18A of AMS 18.

Consumer 6 drinks their coffee at the coffee shop and sees a designated network-connected return bin for reusable coffee cups (return infrastructure 20) within the coffee shop. Consumer 6 proceeds to place the reusable coffee cup in a slot of the designated return bin which automatically scans the QR code on the cup to obtain asset identifier 130. The return bin communicates asset identifier 130 to AMS 18 prompting method 100 to proceed from block 138 to block 150 with "yes" determination at block 140 and a "no" determination at block 148. At block 150 the details of this instance of method 100 are stored in data storage 18A of AMS 18 and method 100 is complete.

From the perspective of consumer 6, the borrowing of the reusable coffee cup (asset 2) for their coffee (product 4) was accomplished with minimal extra steps, without pre-authorization tying up funds on their credit card, without a deposit being paid and without any additional cost as compared to what would otherwise occur with a similar purchase of a coffee (product 4) in a disposable coffee cup. Further, the security of payment information 120 was no different than would be the case with a similar purchase of a coffee (product 4) in a disposable coffee cup since payment information is not received by or stored by AMS 18.

Exemplary Second Implementation of Method 100

Figure 6:
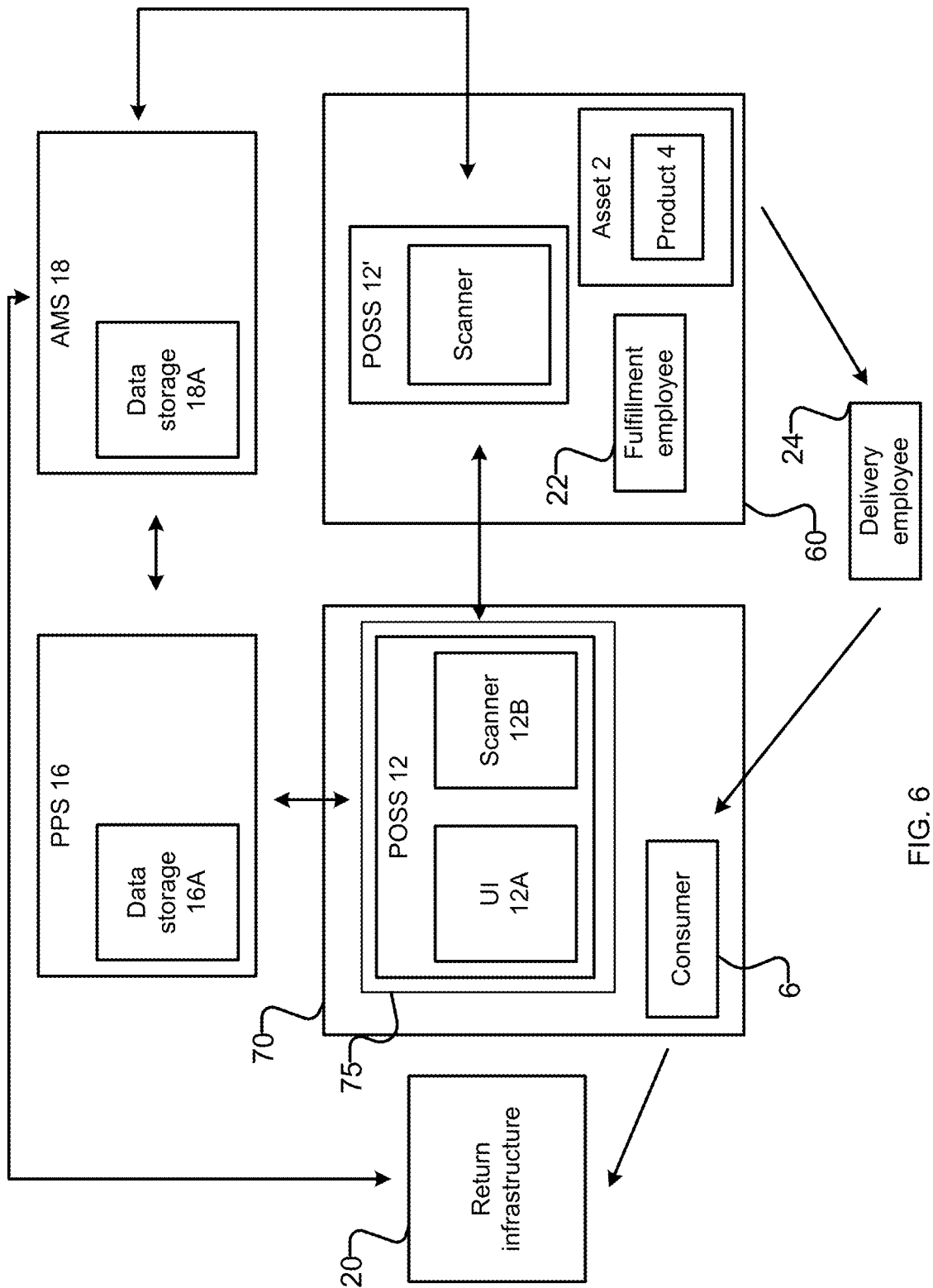
FIG. 6 is a schematic diagram of another exemplary implementation of a method of managing distribution of an asset in association with a transaction for purchase of a product according to one embodiment of the invention.

In a second exemplary non-limiting implementation of method 100 depicted schematically in FIG. 6, a consumer 6 is purchasing shampoo (product 4) for delivery to their home 70 via an online store of merchant 60 accessed through their device 75 (e.g., a mobile device, personal computer, etc.) and consumer 6 wishes for their shampoo to be provided in a reusable container (asset 2).

Figure 7:
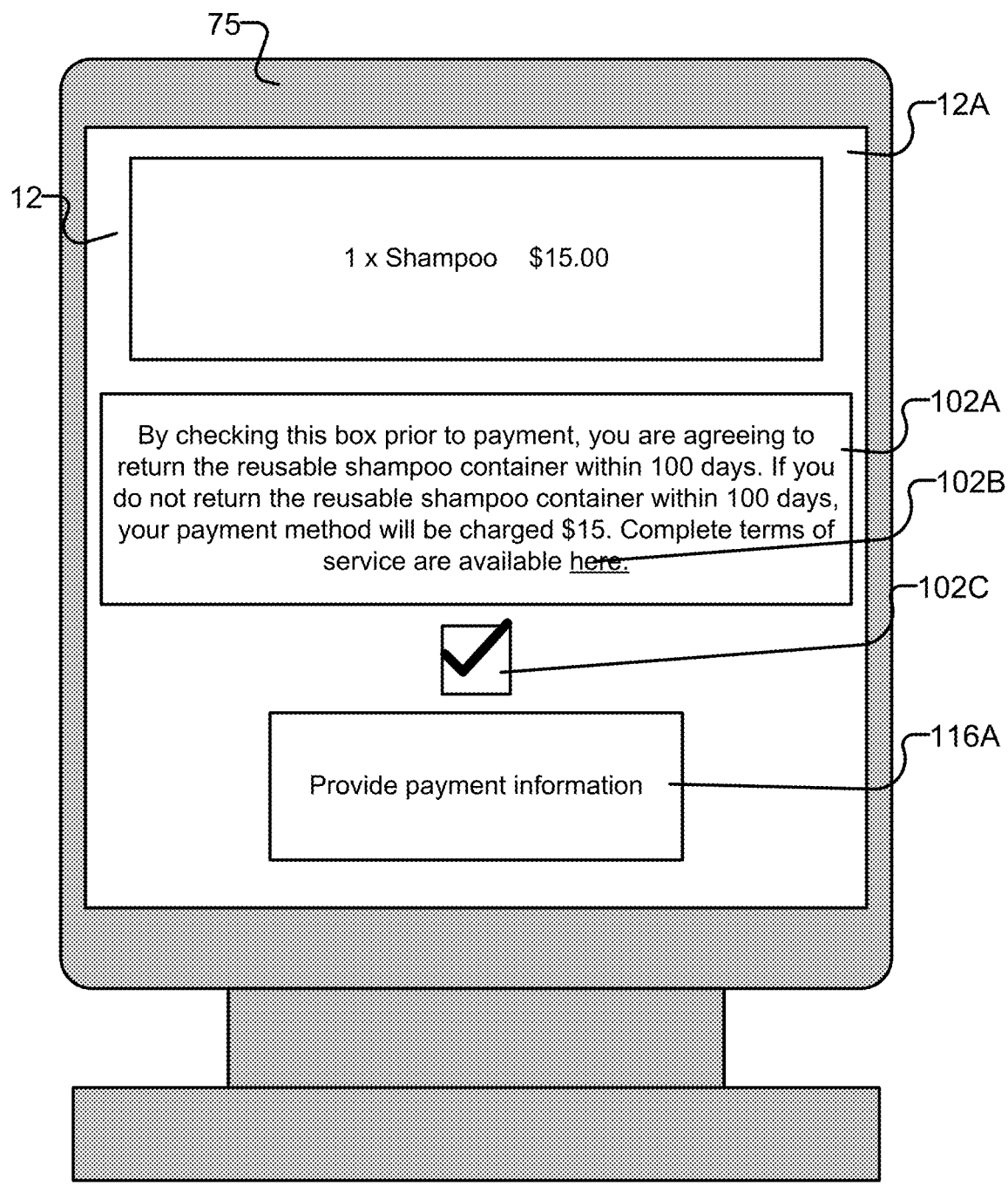
FIG. 7 is a schematic diagram of another exemplary graphical user interface of a point of sale system of the system of FIG. 2.

Prior to the start of method 100, consumer 6 browses the online store of merchant 60 on their device 75 to find the shampoo that they wish to purchase and clicks an "add to cart" button on the web page. Consumer 6 is then directed to a checkout page (or consumer 6 clicks a "go to checkout page" button). At the checkout page, POSS 12 simultaneously presents consumer 6 with prompt 102A and prompt 116A according to blocks 102 and 116 as shown, for example, in FIG. 7. Consumer 6 reads prompt 102A and provides acceptance 114 of agreement 104 by checking box 102C. Consumer 6 then provides their payment information 120 by typing payment information 120 into device 75 (or by otherwise providing payment information 120 stored in device 75).

Payment information 120 is sent to PPS 16 by POSS 12 and payment for the shampoo is processed according to block 108 by PPS 16 using payment information 120. PPS 16 then stores payment information 120 (e.g., the credit card number, expiry date and security code) in data storage 16A of PPS 16, according to block 122, in association with consumer identifier 126, according to block 124.

At any time after the occurrence of a "yes" determination at both block 106 and block 118, POSS 12 may provide the details of the order of consumer 6 to fulfillment employee 22 located at a fulfillment center of merchant 60. Fulfillment employee 22 may then retrieve the reusable shampoo container from storage (e.g., a stack of clean reusable containers). Fulfillment employee 22 inputs an asset identifier 130 represented by an RFID tag on the shampoo container via a scanner attached to secondary POSS 12', according to block 128, and proceeds to fill the reusable container with shampoo before it is picked up by a delivery employee 24 and delivered to consumer 6 at their home 70.

At block 132, the magnitude of the term 112 (e.g., 100 days as set out in FIG. 7), the magnitude of penalty 110 (e.g., $15 as set out in FIG. 7), consumer identifier 126 and asset identifier 130 (together comprising transaction information 134) are received by AMS 18. One or more of the magnitude of the term 112, the magnitude of penalty 110 and consumer identifier 126 may be received at AMS 18 via PPS 16 while asset identifier 130 may be received at AMS 18 directly from secondary POSS 12'.

At block 136, transaction information 134 is stored in data storage 18A of AMS 18. Since, in this exemplary embodiment, consumer 6 has never borrowed assets 2 using payment information 120, transaction information 134 is associated with a new profile of consumer 6 stored in data storage 18A of AMS 18. Since asset identifier 130 was received by AMS 18 separately from term 112, penalty 110 and/or consumer identifier 126, AMS 18 associates asset identifier 130 with the separately-received term 112, penalty 110 and/or consumer identifier 126 at block 136 (e.g., based on a transaction identifier generated by POSS 12 or PPS 16 or based on other contextual information).

Over the following 100 days, consumer 6 does not finish the shampoo and therefore does not return the reusable shampoo container. Meanwhile, AMS 18 is monitoring for the return of the reusable shampoo container according to block 138 and at the end of 100 days, AMS 18 sends a request to PPS 16 for payment of penalty 110 at block 144 based on a "no" determination at block 140 and a "yes" determination at block 142. The request contains the magnitude of penalty 110 and consumer identifier 126. PPS 16 then process payment of penalty 110 using stored payment information 120 (stored at block 122) and sends a confirmation to AMS 18 that payment of penalty 110 has occurred. AMS 18 and/or PPS 16 then sends a report to consumer 6 informing them that they have been charged with penalty 110 for failure to return the reusable shampoo container. At block 150 the details of this instance of method 100 are stored in data storage 18A of AMS 18. Method 100 is optionally complete at this point.

110 days after transaction 50 occurred, consumer 6 finishes the shampoo and returns the reusable shampoo container via return infrastructure 20 (e.g., a designated return bin) monitored by AMS 18. Depending on the terms of agreement 104, AMS 18 may optionally send a request to PPS 16 to refund at least a portion of penalty 110 at block 152 based on "yes" determination at block 140 and a "yes" determination at block 148. At block 150 the new details of this instance of method 100 are stored in data storage 18A of AMS 18 and method 100 is complete.

From the perspective of consumer 6, the borrowing of the reusable shampoo container (asset 2) for their shampoo (product 4) was accomplished with minimal extra steps as compared to a similar purchase of a shampoo (product 4) in a disposable container and the only cost paid by consumer 6 was due to a late return of asset 2. Further, the security of payment information 120 was no different than would be the case with a similar purchase of shampoo (product 4) in a disposable container since payment information is not received by or stored by AMS 18.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein","above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g., a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

In some embodiments, a non-transitory, computer readable medium is provided having one or more of an application program including computer instructions configured to cause at least one server and/or at least one processor to perform the methods (or one or more steps/blocks thereof) according to any of the disclosed methods.

Method embodiments (as well as one or more steps thereof) can be configured as computer readable program instructions (corresponding to the blocks/steps/methods) and can be downloaded to respective computing/processing devices from a computer readable storage medium or to an external computer or external storage device via a network, for example, the Internet, a local area network, a wide area network and/or a wireless network.

Aspects of the present disclosure are described sometimes with reference to a flow, a flow diagram, and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions, operable, for example, on one or more components (e.g., server(s), processor(s)). These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks, in accordance with embodiments of the present disclosure.

Any flowchart and block diagrams of the present disclosure are examples of architecture, functionality, and operations, of at least some of the embodiments of systems, methods, and computer readable media supported herein. In this regard, each block in the flowchart or block diagrams may represent a module, segment, or portion of instructions, which includes one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be understood that at least some embodiments of the present disclosure can correspond to a cloud computing environment, but are not so limited, as embodiments of the present disclosure are capable of being implemented in conjunction with any other type of computing environment now known or later developed. With respect to a cloud computing environment, such is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An asset management method comprising:
receiving, at an asset management system, an indication of acceptance of an agreement for borrowing of an asset by a first consumer as part of a transaction for a first product;
receiving, at the asset management system, a consumer identifier corresponding to the first consumer from a payment processing system employed to process a payment for the transaction for the first product using payment information of the first consumer;
receiving, at the asset management system, an asset identifier indicative of the asset;
obtaining, by the asset management system, a term for a return of the asset;
obtaining, by the asset management system, a magnitude of a penalty payable upon the return of the asset not occurring within the term;
storing the asset identifier, the term and the penalty in a data storage of an asset management server of the asset management system in association with the consumer identifier;
storing the payment information of the first consumer in a data storage of a payment processing server of the payment processing system in association with the consumer identifier;
monitoring, by the asset management system, for the return of the asset; and
initiating a charge to the first consumer for the penalty when the term elapses without the return of the asset occurring by sending a request from the asset management system to the payment processing system to charge the first consumer an amount equal to the magnitude of the penalty via the payment processing system using the payment information of the first consumer stored in the data storage of the payment processing server of the payment processing system in association with the consumer identifier.

2. A method according to claim 1 wherein the indication of the acceptance is received from a point of sale system.

3. A method according to claim 1 wherein receiving the indication of acceptance comprises receiving the consumer identifier.

4. A method according to claim 1 wherein obtaining the term comprises receiving an indication of the term from the payment processing system.

5. A method according to claim 1 wherein obtaining the term comprises determining the term based at least in part on a type of asset associated with the asset identifier.

6. A method according to claim 1 wherein obtaining the term comprises determining the term based at least in part on the consumer identifier.

7. A method according to claim 1 wherein obtaining the penalty comprises receiving an indication of the penalty from the payment processing system.

8. A method according to claim 1 wherein obtaining the penalty comprises determining the penalty based at least in part on a type of asset associated with the asset identifier.

9. A method according to claim 1 wherein obtaining the penalty comprises determining the penalty based at least in part on the consumer identifier.

10. A method according to claim 1 comprising upon the return of the asset occurring after sending the request to the payment processing system to charge the first consumer in the amount of the penalty using the payment information of the first consumer, sending, from the asset management system, a further request to the payment processing system to refund the first consumer at least a portion of the amount of the penalty using the payment information of the first consumer.

11. A method according to claim 1 wherein the asset comprises a reusable container.

12. A method according to claim 1 wherein:
receiving acceptance of the first agreement comprises receiving the payment information from the first consumer; and
the payment information is obtained from the transaction for the first product.

13. A method according to claim 1 comprising upon receiving acceptance of the agreement for borrowing of the asset, providing the asset to the first consumer without requesting the payment processing system to charge the first consumer a deposit for the asset and without requesting the payment processing system to authorize a deposit for the asset with the payment information.

14. A method according to claim 1 comprising providing the asset to the first consumer upon receipt, by the asset management system, of the indication of acceptance of the agreement for borrowing of the asset by the first consumer.

15. A method according to claim 1 wherein receiving the payment information from the first consumer comprises receiving a consumer identifier of the consumer and obtaining the payment information from a record stored in the data storage of a payment processing server of the payment processing system in association with the consumer identifier wherein receiving a consumer identifier of the consumer comprises receiving a previously borrowed asset and obtaining the consumer identifier of the consumer based on an asset identifier of the previously borrowed asset.

16. A method according to claim 1 wherein receiving acceptance of the first agreement comprises receiving a consumer identifier of the consumer and confirming that the acceptance has previously been provided in association with the consumer identifier and wherein receiving a consumer identifier of the consumer comprises receiving a previously borrowed asset and obtaining the consumer identifier of the consumer based on an asset identifier of the previously borrowed asset.

17. An asset management system comprising:
a processor configured for:
  receiving an indication of acceptance of an agreement for borrowing of an asset by a first consumer as part of a transaction for a first product;
  receiving a consumer identifier corresponding to the first consumer from a payment processing system employed to process a payment for the transaction for the first product using payment information of the first consumer;
  receiving an asset identifier indicative of the asset;
  obtaining a term for a return of the asset;
  obtaining a magnitude of a penalty payable upon the return of the asset not occurring within the term;
  storing the asset identifier, the term and the penalty in a data storage of an asset management server of the asset management system in association with the consumer identifier;
  monitoring for the return of the asset; and
  initiating a charge to the first consumer for the penalty upon the return of the asset not occurring within the term by sending a request to the payment processing system to charge the first consumer an amount equal to the magnitude of the penalty via the payment processing system using the payment information of the first consumer stored in a data storage of a payment processing server of the payment processing system in association with the consumer identifier.

18. A system comprising:
a point of sale system configured for:
  prompting the first consumer to pay for a product by providing payment information; and
  receiving the payment information from the first consumer;
a payment processing system configured for:
  receiving the payment information from the point of sale system;
  processing payment for the product with the payment information; and
  storing the payment information in a data storage of a payment processing server of the payment processing system in association with a consumer identifier;
an asset management system configured for:
  receiving an indication of acceptance of an agreement for borrowing of an asset by the first consumer;
  receiving the consumer identifier corresponding to the first consumer;
  receiving an asset identifier indicative of the asset;
  obtaining a term for a return of the asset;
  obtaining a penalty payable upon the return of the asset not occurring within the term;
  storing the asset identifier, the term and the penalty in a data storage of an asset management server of the asset management system in association with the consumer identifier;
  monitoring for the return of the asset; and
  initiating a charge to the first consumer for the penalty upon the return of the asset not occurring within the term by sending a request to the payment processing system to charge the first consumer in the amount of the penalty using the payment information of the first consumer stored in the data storage of the payment processing server of the payment processing system in association with the consumer identifier.

* * * * *